(12) United States Patent
Sakakura et al.

(10) Patent No.: US 12,345,591 B2
(45) Date of Patent: Jul. 1, 2025

(54) SENSOR AND ELECTRONIC APPARATUS

(71) Applicant: Sony Group Corporation, Tokyo (JP)

(72) Inventors: Yoshiaki Sakakura, Tokyo (JP); Ken Kobayashi, Tokyo (JP); Tetsuro Goto, Tokyo (JP); Kei Tsukamoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 337 days.

(21) Appl. No.: 17/908,051

(22) PCT Filed: Mar. 11, 2021

(86) PCT No.: PCT/JP2021/009800
§ 371 (c)(1),
(2) Date: Aug. 30, 2022

(87) PCT Pub. No.: WO2021/200014
PCT Pub. Date: Oct. 7, 2021

(65) Prior Publication Data
US 2023/0009475 A1    Jan. 12, 2023

(30) Foreign Application Priority Data

Mar. 31, 2020    (JP) ................. 2020-065244

(51) Int. Cl.
*G01L 5/00*  (2006.01)
*G01L 1/14*  (2006.01)

(52) U.S. Cl.
CPC .............. *G01L 5/009* (2013.01); *G01L 1/146* (2013.01)

(58) Field of Classification Search
CPC ........... G01L 1/14; G01L 1/142; G01L 1/144; G01L 1/146; G01L 1/148; G01L 1/00;
(Continued)

(56) References Cited

U.S. PATENT DOCUMENTS

| 4,266,263 A | 5/1981 | Haberl |
| 7,926,351 B2 | 4/2011 | Masaki |

(Continued)

FOREIGN PATENT DOCUMENTS

| CN | 100371694 C | * | 2/2008 | ............. G01L 1/142 |
| EP | 3499348 A1 | * | 6/2019 | ............. G01L 1/146 |

(Continued)

OTHER PUBLICATIONS

International Search Report issued in International Patent Application No. PCT/JP2021/009800 on Apr. 13, 2021 and English translation of same. 6 pages.

(Continued)

*Primary Examiner* — Kristina M Deherrera
*Assistant Examiner* — Fatemeh Esfandiari Nia
(74) *Attorney, Agent, or Firm* — K&L Gates LLP

(57) ABSTRACT

A sensor according to the present technology includes a sensor unit and a separation layer. The sensor unit includes a first pressure sensor on a front side and a second pressure sensor on a rear side that are opposite to each other and detects, on the basis of pressure detection positions in an in-plane direction by the first pressure sensor and the second pressure sensor, a force in the in-plane direction. The separation layer has a gap portion and is interposed between the first pressure sensor and the second pressure sensor.

19 Claims, 15 Drawing Sheets

(58) Field of Classification Search
CPC ......... G01L 5/00; G01L 5/0076; G01L 5/008;
G01L 5/0085; G01L 5/009; G01L 5/165;
G01L 5/161; G01L 5/226; G01L 5/162;
G01L 5/1623; G01L 5/163; G01L 5/1627;
G01L 5/164; G01L 5/228
See application file for complete search history.

(56) References Cited

U.S. PATENT DOCUMENTS

| | | | |
|---|---|---|---|
| 2009/0031825 A1* | 2/2009 | Kishida | G01L 5/228 73/862.621 |
| 2013/0275057 A1* | 10/2013 | Perlin | G06F 3/0414 702/41 |
| 2013/0319137 A1* | 12/2013 | Grau | G06F 3/04144 73/862.381 |
| 2014/0350348 A1* | 11/2014 | Tee | A61B 5/205 600/300 |
| 2016/0015311 A1 | 1/2016 | Jiang | |
| 2016/0273987 A1 | 9/2016 | Masuda | |
| 2017/0177114 A1* | 6/2017 | Frey | G06F 3/0445 |
| 2019/0234814 A1* | 8/2019 | Yoon | H01B 3/30 |
| 2021/0278300 A1* | 9/2021 | Bao | B25J 19/02 |

FOREIGN PATENT DOCUMENTS

| | | |
|---|---|---|
| JP | 2008-101384 A | 5/2008 |
| JP | 2009-034742 A | 2/2009 |
| JP | 2012-247297 A | 12/2012 |
| JP | 2020-046375 A | 3/2020 |
| WO | WO2019/135401 A1 | 7/2019 |

OTHER PUBLICATIONS

Written Opinion issued in International Patent Application No. PCT/JP2021/009800 on Apr. 13, 2021. 4 pages.

* cited by examiner

| | Separation layer | | Separation layer shape | Detection sensitivity in in-plane direction (S/N) | Variation in sensitivity in in-plane direction (%) | Resolution of sensitivity in in-plane direction (%) |
|---|---|---|---|---|---|---|
| | Thickness | Material and penetration | | | | |
| Example 1 | 2000μm | Silicone gel 110° | D (Divided into 9) | ○ 4.5 | 130% | 50% |
| Example 2 | 4000μm | Silicone gel 110° | D (Divided into 9) | ○ 7.5 | 130% | 50% |
| Example 3 | 4000μm | Silicone gel 110° | C (Divided into 9) | ○ 7.5 | 130% | 50% |
| Example 4 | 4000μm | Silicone gel 110° | B (Divided into 9) | ○ 10.0 | 100% | 25% |
| Example 5 | 4000μm | Silicone gel 110° | A (Divided into 9) | ○ 10.0 | 100% | 25% |
| Example 6 | 4000μm | Silicone gel 110° | A (Divided into 81) | ○ 10.0 | 100% | 10% |
| Comparative Example 1 | 2000μm | Silicone gel 110° | F | ○ 3.0 | 240% | 100% |
| Comparative Example 2 | 4000μm | Silicone gel 110° | F | ○ 5.0 | 200% | 80% |

FIG.11

|  | Deformation layer | | | | Detection sensitivity in perpendicular direction (S/N) | |
| --- | --- | --- | --- | --- | --- | --- |
|  | Thickness (μm) | Weight per unit area (mg/cm2) | Product name | Material | 1kPa | 100kPa |
| Example 7 | 300 | 7.2 | Foam film PORON SS-24DP | Polyurethane | 3.0 | 80 |
| Example 8 | 500 | 12 | Foam film PORON SS-24DP | Polyurethane | 2.5 | 120 |
| Example 9 | 1000 | 24 | Foam film PORON SS-24DP | Polyurethane | 2.0 | 150 |
| Example 10 | 150 | 4 | Foam film PORON SS-15DP | Polyurethane | 4.0 | 200 |
| Example 11 | 500 | 7.5 | Nanofiber | Polyurethane | 2.0 | 60 |
| Example 12 | 1000 | 48 | Foam film PORON SR-S-48 | Polyurethane | 1.5 | 80 |
| Comparative Example 3 | 100 | 3 | Foam film Purecell S010 | Polyurethane | 2.0 | × 20 |
| Comparative Example 4 | 1000 | 60 | Foam film PORON NU60 | Polyurethane | × 1 or less | 30 |
| Comparative Example 5 | 1200 | 48 | Foam film PORON MS40 | Polyurethane | × 1 or less | 80 |

FIG.14

| | First deformation layer | | | | | Second deformation layer | | Sensitivity at 10 gf | Sensitivity at 1 kgf | Results of sensitivity evaluation |
|---|---|---|---|---|---|---|---|---|---|---|
| | Material | Product name | Thickness (μm) | Area occupation rate (%) | Weight per unit area (mg/cm²) | Material | Product name | | | |
| Example 13 | Nanofiber layer(1) | — | 150 | 100 | 4 | Double-sided tape | Neofix100 | 10 | 150 | Good |
| Example 14 | Nanofiber layer(2) | — | 400 | 100 | 10 | Double-sided tape | Neofix100 | 40 | 300 | Good |
| Example 15 | Foam film | PORON SR-S-32P | 200 | 100 | 6 | Double-sided tape | Neofix100 | 10 | 200 | Good |
| Example 16 | Foam film | PORON SS-32P | 500 | 100 | 16 | Double-sided tape | Neofix100 | 30 | 350 | Good |
| Example 17 | Foam film | PORON SS-24P | 300 | 100 | 7 | Double-sided tape | Neofix100 | 50 | 350 | Good |
| Example 18 | Foam film | PORON SS-24P | 500 | 100 | 12 | Double-sided tape | Neofix100 | 40 | 400 | Good |
| Example 19 | Foam film | PORON SS-15P | 500 | 100 | 8 | Double-sided tape | Neofix100 | 50 | 400 | Good |
| Example 20 | Foam film | PORON SR-S-40P | 1000 | 100 | 40 | Double-sided tape | Neofix100 | 15 | 200 | Good |
| Example 21 | Foam film | PORON HH48 | 1000 | 100 | 50 | Double-sided tape | Neofix100 | 10 | 150 | Good |
| Example 22 | Foam film | PORON SS-24P | 500 | 100 | 12 | Foam film | PORON SS-24P | 60 | 500 | Good |
| Example 23 | Foam film | PORON SS-24P | 500 | 100 | 12 | Foam film | PORON SS-32P | 50 | 600 | Good |
| Example 24 | Foam film | PORON SS-24P | 500 | 100 | 12 | Silicone gel | FFG-42100-1t | 40 | 400 | Good |
| Comparative Example 6 | Foam film | Purecell S010 | 100 | 100 | 3 | Double-sided tape | Neofix100 | ×5 | ×100 | Bad |
| Comparative Example 7 | Foam film | PORON H48 | 1500 | 100 | 70 | Double-sided tape | Neofix100 | ×5 | ×30 | Bad |
| Comparative Example 8 | Foam film | PORON H48 | 1500 | 100 | 70 | Foam film | PORON H48 | ×5 | ×50 | Bad |

FIG.17

| | First deformation layer | | | | Second deformation layer | | | | Detection sensitivity in perpendicular direction (S/N) | | Displacement detection sensitivity (S/N) 5μm |
|---|---|---|---|---|---|---|---|---|---|---|---|
| | Thickness (μm) | Weight per unit area (mg/cm2) | Product name | Material | Thickness (μm) | Weight per unit area (mg/cm2) | Product name | Material | 1kPa | 100kPa | |
| Example 25 | 100 | 2.5 | Nanofiber layer | Polyurethane | 500 | 12 | Foam film PORON SS-24DP | Polyurethane | 3 | 120 | 5 |
| Example 26 | 25 | 0.9 | Nanofiber layer | Polyurethane | 500 | 12 | Foam film PORON SS-24DP | Polyurethane | 3 | 120 | 10 |
| Example 27 | 25 | 0.9 | Nanofiber layer | Polyurethane | 500 | 7.5 | Foam film PORON SS-15DP | Polyurethane | 10 | 200 | 15 |
| Comparative Example 9 | 500 | 12 | Foam film PORON SS-24DP | Polyurethane | 100 | | Double-sided tape NeoFix100 | | 3 | 120 | × 1 or less |
| Comparative Example 10 | 25 | 0.9 | Nanofiber layer | Polyurethane | 100 | | Double-sided tape NeoFix100 | | 2 | × 20 | 20 |

FIG. 18

SENSOR AND ELECTRONIC APPARATUS

TECHNICAL FIELD

The present technology relates to a sensor that detects a force.

BACKGROUND ART

In recent years, automation of work by robots has been studied in various scenes due to a decrease in working population. For controlling a behavior of a robot hand with high accuracy, it is necessary to detect how much force acts on a surface of the robot hand.

Patent Literature 1 below has disclosed a technology in which a sensor provided in a palm of a robot hand detects a force (slip) with respect to the palm when the robot hand grips a target object.

The sensor includes a pressure detector as an upper layer, a pressure detector as a lower layer, and a deformation portion interposed between the two pressure detectors. In this sensor, when a shear force is applied in a in-plane direction to the sensor, the deformation layer shear-deforms and a difference is generated between a pressure center position detected by the pressure detector as the upper layer and a pressure center position detected by the pressure detector as the lower layer. The difference is correlated to the applied shear force.

CITATION LIST

Patent Literature

Patent Literature 1: Japanese Patent Application Laid-open No. 2009-34742

DISCLOSURE OF INVENTION

Technical Problem

In the technology described in Patent Literature 1, how much degree the deformation layer shear-deforms depends on which position the shear force is applied to in the in-plane direction of the sensor. Therefore, the detection sensitivity of the shear force causes a variation.

In view of the above-mentioned circumstances, it is an object of the present technology to provide a technology capable of making detection sensitivity of a shear force uniform irrespective of a position of the shear force in an in-plane direction of a sensor.

Solution to Problem

A sensor according to the present technology includes a sensor unit and a separation layer. The sensor unit includes a first pressure sensor on a front side and a second pressure sensor on a rear side that are opposite to each other and detects, on the basis of pressure detection positions in an in-plane direction by the first pressure sensor and the second pressure sensor, a force in the in-plane direction. The separation layer has a gap portion and is interposed between the first pressure sensor and the second pressure sensor.

By providing the separation layer with the gap portion in this manner, the detection sensitivity of the shear force can be made uniform irrespective of the position of the shear force in the in-plane direction of the sensor.

An electronic apparatus according to the present technology includes a sensor. The sensor includes a sensor unit and a separation layer.

The sensor unit includes a first pressure sensor on a front side and a second pressure sensor on a rear side that are opposite to each other and detects, on the basis of pressure detection positions in an in-plane direction by the first pressure sensor and the second pressure sensor, a force in the in-plane direction.

The separation layer has a gap portion and is interposed between the first pressure sensor and the second pressure sensor.

BRIEF DESCRIPTION OF DRAWINGS

FIG. 11 A diagram showing respective examples and respective comparative examples of the separation layer.

FIG. 14 A diagram showing respective examples and respective comparative examples of a deformation layer.

FIG. 17 A diagram showing respective examples and respective comparative examples according to the second embodiment.

FIG. 18 A diagram showing respective examples and respective comparative examples according to a third embodiment.

MODE(S) FOR CARRYING OUT THE INVENTION

Hereinafter, embodiments according to the present technology will be described with reference to the drawings.

First Embodiment

<Overall Configuration and Configurations of Respective Parts>

Figure 1:
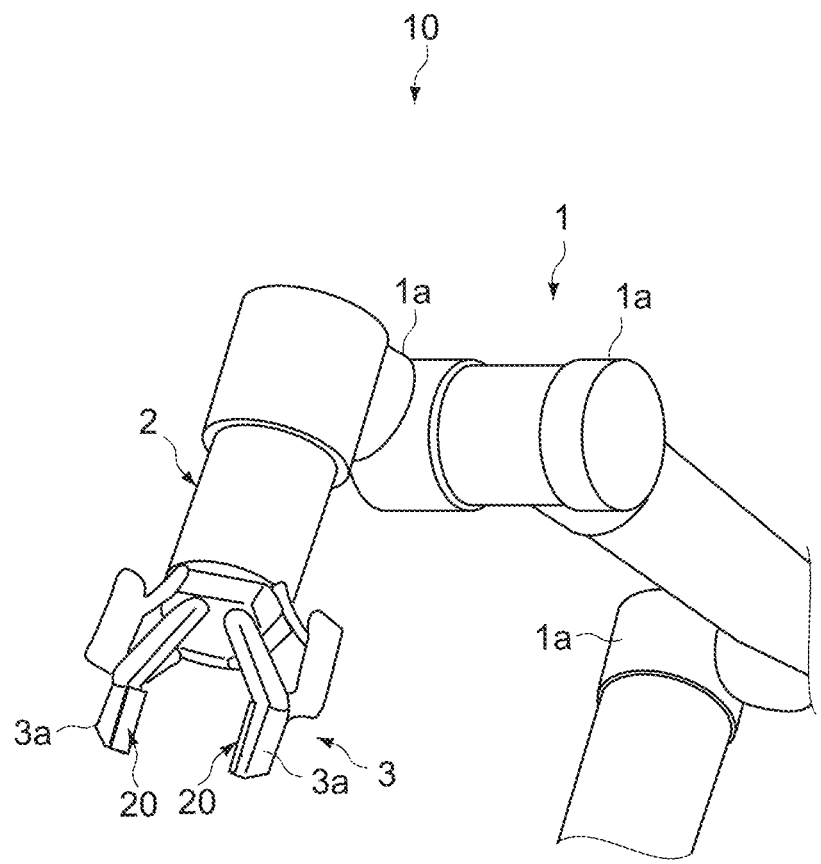
FIG. 1 A diagram showing a robot hand according to a first embodiment of the present technology.

FIG. 1 is a diagram showing a robot hand 10 according to a first embodiment of the present technology. As shown in FIG. 1, the robot hand 10 includes an arm portion 1, a wrist portion 2, and a hand portion 3.

The arm portion 1 has a plurality of joint portions 1a, and driving of the joint portions 1a can move the hand portion 3 to an arbitrary position. The wrist portion 2 is rotatably connected to the arm portion 1, and its rotation can rotate the hand portion 3.

The hand portion 3 has two finger portions 3a opposite to each other, and driving of the two finger portions 3a can grip the target object between the two finger portions 3a. It should be noted that although the hand portion 3 is configured to have the two fingers in the example shown in FIG. 1, the number of finger portions 3a can be modified as appropriate, e.g., three or four.

Surfaces opposite to each other in the two finger portions 3a are provided with sensors 20, respectively. The sensor 20 is capable of detecting a force applied in a perpendicular direction (Z-axis direction) to the sensor 20 and is also capable of detecting a force applied in an in-plane direction (X-axis direction and Y-axis direction) to the sensor 20. That is, the sensor 20 is a three-axis sensor capable of detecting a force corresponding to three-axis directions. It should be noted that the configuration of the sensor 20 will be described later with reference to FIG. 2 and the like.

The robot hand 10 is driven under the control of a control apparatus (not shown). The control apparatus may be a dedicated apparatus in the robot hand 10 or may be a generally-used apparatus. In a case where the control apparatus is a generally-used apparatus, the control apparatus may be, for example, a personal computer (PC), a mobile phone (including a smartphone), a server apparatus in a network, or the like.

The control apparatus includes a control unit, a storage unit, and the like. The control unit is, for example, a central processing unit (CPU), and controls driving of the respective parts of the robot hand 10 on the basis of a program stored in the storage unit. Typically, the control unit acquires information about forces in the three-axis directions detected by the sensors 20, and controls driving of the hand portion 3 so as to grip the target object stably with a suitable gripping force on the basis of this information about the force.

The storage unit includes a nonvolatile memory in which various programs and data necessary for processing of the control unit is stored and a volatile memory that is used as a working area for the control unit. The various programs may be read from a portable recording medium such as a semiconductor memory or may be downloaded from a server apparatus in a network.

[Sensor 20]

Figure 2:
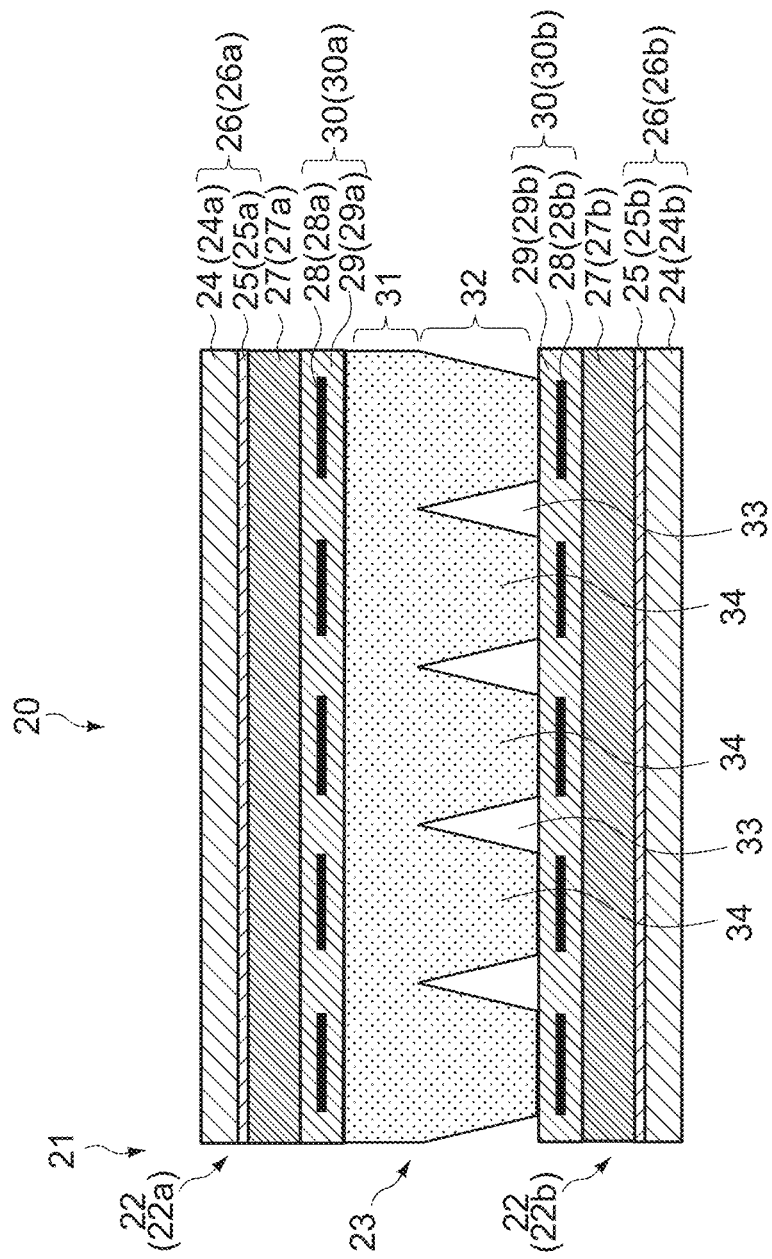
FIG. 2 A cross-sectional view of a sensor as it is viewed from the side.
Figure 3:
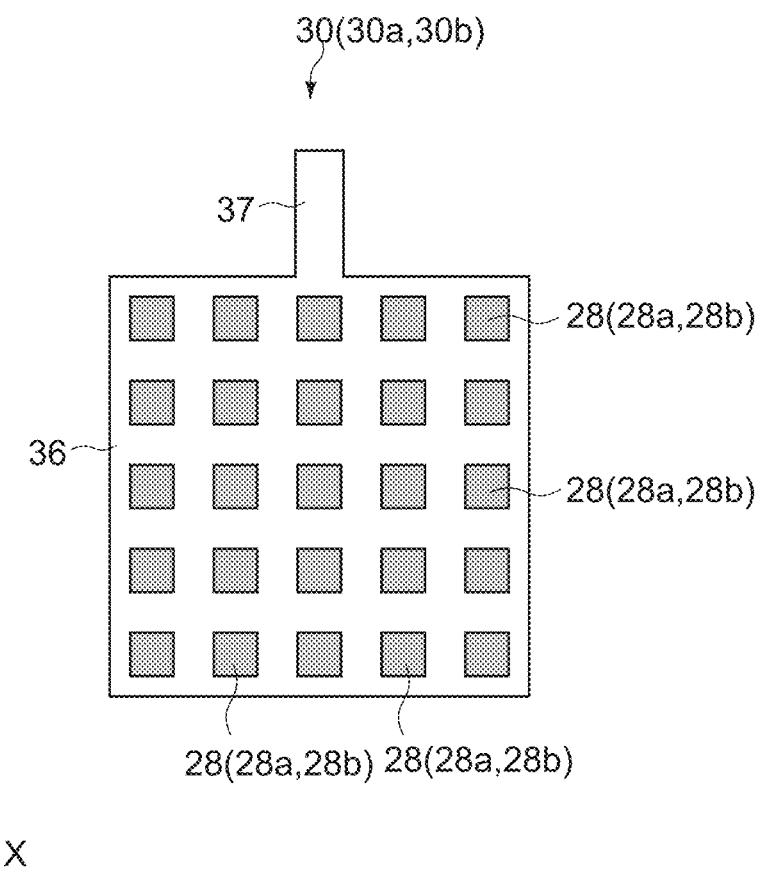
FIG. 3 A plan view showing a sensor electrode layer in the sensor.
Figure 4:
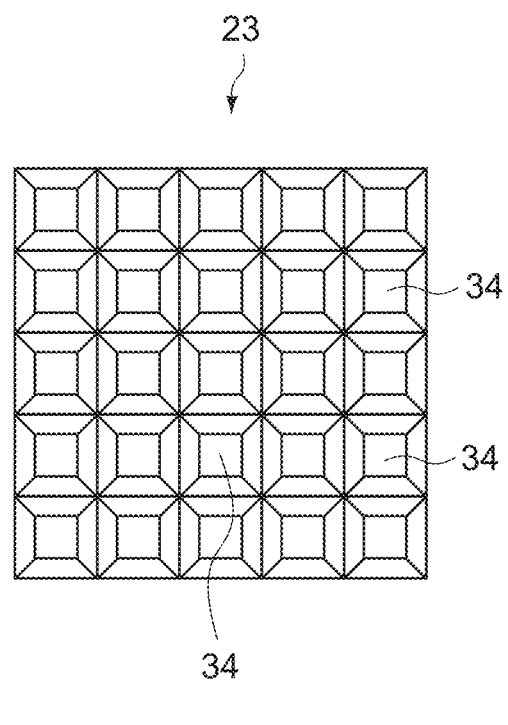
FIG. 4 A diagram of a separation layer in the sensor as it is viewed from the rear side.

FIG. 2 is a cross-sectional view of the sensor 20 as it is viewed from the side. FIG. 3 is a plan view showing sensor electrode layers 30 in the sensor 20. FIG. 4 is a diagram of a separation layer 23 in the sensor 20 as it is viewed from the rear side.

In each figure of the sensor 20, the X-axis direction and the Y-axis direction are the in-plane direction parallel to a sensing surface of the sensor 20, and the Z-axis direction is a perpendicular direction perpendicular to the sensing surface. It should be noted that in FIG. 2, the upper side corresponds to a front side on which an external force is applied and the lower side corresponds to a rear side opposite thereto.

As shown in FIGS. 2 to 4, the sensor 20 generally has a rectangular plate-like shape in a plan view. It should be noted that typically, the shape of the sensor 20 in the plan view only needs to be set as appropriate depending on a shape of a portion in which the sensor 20 is disposed, and the shape of the sensor 20 in the plan view is not particularly limited. For example, the shape of the sensor 20 in the plan view may be a polygonal shape, a circular shape, an elliptical shape, or the like other than the rectangular shape.

The sensor 20 includes a sensor unit 21 having the first pressure sensor 22a on the front side and the second pressure sensor 22b on the rear side and the separation layer 23 interposed between a first pressure sensor 22a and a second pressure sensor 22b. That is, the sensor 20 has a laminate structure in which the second pressure sensor 22b, the separation layer 23, and the first pressure sensor 22a are stacked in order from the side of the lower layer in the perpendicular direction. It should be noted that the two pressure sensors 22a and 22b will be simply referred to as pressure sensors 22 in a case where the two pressure sensors 22a and 22b are not particularly distinguished from each other in the description below.

On the upper side (front side) of the first pressure sensor 22a, there is provided a viscoelastic layer (not shown) having hardness similar to that of human skin, for example. The viscoelastic layer transmits the external force to the sensor 20 while deforming in accordance with the external force.

"Sensor Unit 21"

On the basis of the pressure center position (pressure detection position) in the in-plane direction based on the first pressure sensor 22a and the pressure center position (pressure detection position) in the in-plane direction based on the second pressure sensor 22b, the sensor unit 21 detects a force (shear force Fs) applied in the in-plane direction to the sensor 20. Further, on the basis of a pressure value detected by the first pressure sensor 22a, the sensor unit 21 detects a force (load Fz) applied from the upper side in the perpendicular direction to the sensor 20.

It should be noted that on the basis of two values of the pressure value detected by the first pressure sensor 22a and a pressure value detected by the second pressure sensor 22b, the sensor unit 21 may detect a force applied from the upper side in the perpendicular direction to the sensor 20. That is, typically, on the basis of the pressure value detected by at least the first pressure sensor 22a of the first pressure sensor 22a and the second pressure sensor 22b, the sensor unit 21 only needs to be configured to detect a force applied from the upper side in the perpendicular direction.

(First Pressure Sensor 22a and Second Pressure Sensor 22b)

The first pressure sensor 22a and the second pressure sensor 22b are disposed opposite to each other in the perpendicular direction. The first pressure sensor 22a may have a laminate structure in which a sensor electrode layer 30a, a deformation layer 27a, and an electrode film layer 26a are stacked in order from the side of the lower layer in the perpendicular direction. Further, the second pressure sensor 22b has a laminate structure in which an electrode film layer

26b, a deformation layer 27b, and a sensor electrode layer 30b are stacked in order from the side of the lower layer in the perpendicular direction.

As it will be understood from the description here, the first pressure sensor 22a and the second pressure sensor 22b are disposed so that they are inverted in the upper and lower directions. Therefore, the first pressure sensor 22a and the second pressure sensor 22b are configured so that the sensor electrode layers 30 of both are disposed on a side of the separation layer 23. It should be noted that the first pressure sensor 22a and the second pressure sensor 22b have basically similar configurations except for the point that they are inverted in the upper and lower directions. It should be noted that the first pressure sensor 22a and the second pressure sensor 22b may be disposed so that they are not inverted in the upper and lower directions.

(Sensor Electrode Layers 30)

Each of the sensor electrode layers 30 (see FIGS. 2 and 3) is constituted by a flexible printed circuit or the like. The sensor electrode layer 30 includes a rectangular main body 36 in the plan view and an extending portion 37 extended outward from the main body 36. The extending portion 37 is provided to output information about a pressure detected by the pressure sensor 22 to the control unit or the like. It should be noted that the shape of the sensor electrode layer in the plan view is not limited to the rectangle, and can be modified as appropriate.

The sensor electrode layer 30 includes a base material 29 having flexibility and a plurality of sensing portions 28 provided inside the base material 29.

As a material of the base material 29, for example, polymer resin such as polyethylene terephthalate, polycarbonate, and acrylic resin is used.

The sensing portions 28 are regularly arranged at predetermined intervals vertically and horizontally (vertical: Y-axis direction, horizontal: X-axis direction). In the example shown in FIG. 3, the number of sensing portions 28 is 5×5 (vertical×horizontal), 25 in total. It should be noted that the number of sensing portions 28 can be modified as appropriate.

The sensing portions 28 are capacitive sensors capable of detecting changes in distance to a reference electrode layer 25 of an electrode film layer 26 as changes in capacitance. The sensing portions 28 has, for example, a comb teeth-like pulse electrode (not shown) and a comb teeth-like sense electrode. The comb teeth-like pulse electrode and the comb teeth-like sense electrode are disposed so that the comb teeth face each other, and also disposed so that one comb teeth are inserted into gaps between the other comb teeth. It should be noted that the type of the sensing portions 28 is not particularly limited, and any type may be used.

(Electrode Film Layer 26)

Each of the electrode film layers 26 has flexibility and includes a film layer 24 and a reference electrode layer 25 provided on a side of one surface of the film layer 24 (on a side of a surface of a deformation layer 27). The reference electrode layer 25 is a so-called grounding electrode and has a ground potential.

The electrode film layers 26 has a thickness of, for example, approximately 10 μm to 100 μm. Further, the reference electrode layer 25 has a thickness of, for example, approximately 0.05 μm to 0.5 μm.

As a material of the film layer 24, for example, polymer resin such as polyethylene terephthalate, polycarbonate, and acrylic resin is used. Further, as a material of the reference electrode layer 25, for example, an inorganic electrically conductive material, an organic electrically conductive material, an electrically conductive material including both an inorganic electrically conductive material and an organic electrically conductive material, or the like is used.

Examples of the inorganic electrically conductive material can include metal such as aluminum, copper, and silver, alloy such as stainless steel, and metal oxide such as oxide zinc and oxide indium. Further, examples of the organic electrically conductive material can include a carbon material such as carbon black and carbon fibers and electrically conductive polymer such as substituted or non-substituted polyaniline and polypyrrole. It should be noted that regarding the material, any material may be used as long as it is an electrically conductive material.

The reference electrode layer 25 is formed on the film layer 24, for example, by a technique such as vapor deposition, sputtering, bonding, and coating. It should be noted that the film layer 24 can also be omitted, and in this case, the reference electrode layer 25 is constituted by a metal thin plate of stainless steel, aluminum, or the like, electrically conductive fibers, electrically conductive non-woven fabric, or the like.

(Deformation Layer 27)

The deformation layer 27 is interposed between the sensor electrode layers 30 and the electrode film layers 26 (reference electrode layer 25). The deformation layer 27 has a thickness of, for example, approximately 50 μm to 300 μm.

The deformation layer 27 is configured to be elastically deformable in accordance with the external force. When the external force is applied in the perpendicular direction to the sensor 20, the reference electrode layer 25 moves closer to the sensor electrode layer 30 while the deformation layer 27 elastically deforms in accordance with the external force. At this time, in the sensing portions 28, the capacitance between the pulse electrode and the sense electrode changes, and therefore the sensing portions 28 are capable of detecting this change in capacitance as a pressure value.

The thickness of the deformation layer 27 is more than 100 μm and 1000 μm or less and the weight per unit area of the deformation layer 27 is 50 mg/cm$^2$ or more. Setting the thickness and the weight per unit area of the deformation layer 27 to be in these ranges can improve the detection sensitivity of the pressure sensor 22 in the perpendicular direction.

A lower-limit value of the thickness of the deformation layer 27 is not particularly limited as long as it is larger than 100 μm, and the lower-limit value may be, for example, 150 μm or more, 200 μm or more, 250 μm or more, 300 μm or more, or the like.

Further, an upper-limit value of the thickness of the deformation layer 27 is not particularly limited as long as it is 1000 μm or less, and the upper-limit value may be, for example, 950 μm or more, 900 μm or less, 850 μm or less, 800 or less, or the like.

The thickness of the deformation layer 27 is determined in the following manner. First of all, a cross-section is produced by working the pressure sensor 22 by a focused ion beam (IB) method or the like, and a cross-section image (hereinafter, referred to as "cross-section SEM image") is captured by the use of a scanning electron microscope (SEM). Next, a point is randomly selected from the deformation layer 27 in the cross-section SEM image, and the thickness of the deformation layer 27 is measured at the point.

An upper-limit value of the weight per unit area of the deformation layer 27 is not particularly limited as long as it is 50 mg/cm² or more, and the upper-limit value may be, for example, 45 mg/cm² or less, 40 mg/cm² or less, 35 mg/cm² or less, or the like.

A lower-limit value of the weight per unit area of the deformation layer 27 is not particularly limited, and the lower-limit value may be, for example, 3 mg/cm² or more, 5 mg/cm² or more, 7 mg/cm² or more, 10 mg/cm² or more, or the like.

The weight per unit area of the deformation layer 27 is determined in the following manner. First of all, the surface of the deformation layer 27 is exposed by removing (e.g., pealing) the electrode film layer 26 from the pressure sensor 22, and then, in this state, a mass M1 of the pressure sensor 22 is measured. Next, the deformation layer 27 is removed from the pressure sensor 22 (e.g., molten with a solvent), and then, in this state, a mass M2 of the pressure sensor 22 is measured. Finally, the weight per unit area is determined by the following equation.

Weight per unit area of deformation layer27[$mg/cm^2$]=(mass $M1$–mass $M2$)/(area $S$ of deformation layer27)

The deformation layer 27 includes a porous layer. The porous layer may be a fiber layer. The fiber layer is, for example, non-woven fabric or woven fabric. Fibers contained in the fiber layer may be nanofibers or may be thicker fibers. It should be noted that in a case where the deformation layer 27 is a nanofiber layer, the sensitivity of the pressure sensor 22 in the perpendicular direction can be further improved. The fibers may include polymer resin or may include inorganic material. It should be noted that in a case where the fibers include polymer resin, the sensitivity of the pressure sensor 22 in the perpendicular direction can be further improved.

The porous layer includes a three-dimensional stereoscopic structure (irregular network structure like non-woven fabric) formed from a fibrous structure, and a plurality of clearances (thin holes) may be provided. Since the porous layer includes the three-dimensional stereoscopic structure, a structure having high porosity can be produced, and a reduction in the film thickness is also easy.

The fibrous structure is a fibrous matter having a sufficient length with respect to a fiber diameter (diameter). For example, the porous layer is configured by a plurality of fibrous structures assembling and randomly overlapping each other. The porous layer may be configured by a single fibrous structure randomly twisting. Alternatively, a porous layer of a single fibrous structure and porous layers of a plurality of fibrous structures may mix.

The fibrous structure extends in a straight line shape, for example. The fibrous structure may have any shape, and may be curly or may be bent part way, for example. Alternatively, the fibrous structure may branch part way.

A minimum fiber diameter of the fibrous structure is, for example, 500 nm or less, 300 nm or less, or the like. An average fiber diameter is, for example, 0.1 μm or more and 10 μm or less, or the like. Reducing the average fiber diameter increases the hole diameter of thin holes. The average fiber diameter can be measured by microscope observation using a scan-type electronic microscope or the like for example. The average length of the fibrous structure is arbitrary. The fibrous structure is formed by, for example, a phase separation method, a phase inversion method, an electrospinning method, a melt spinning method, a wet spinning method, a dry spinning method, a gel spinning method, a sol-gel method, a spraying method, or the like.

Using such a method can easily and stably form a fibrous structure having a sufficient length with respect to the fiber diameter.

The fibrous structure is formed from at least one of polymer material or inorganic material, and is constituted especially by nanofibers. Here, the nanofibers have a fiber diameter of 1 nm or more and 1000 nm or less and are fibrous matters having a length equal to or larger than a length 100 times as large as the fiber diameter. Using such nanofibers as the fibrous structure increases the porosity and can achieve a reduction in the film thickness. The fibrous structure constituted by the nanofibers may be formed by the electrospinning method. Using the electrospinning method can easily and stably form a fibrous structure having a small fiber diameter.

The deformation layer 27 may be constituted by a patterning structure having a pole structure, for example. A variety of structures such as a matrix pattern, a stripe pattern, a mesh pattern, a radial pattern, a geometric pattern, and a spiral pattern can be employed as the patterning structure.

"Separation Layer 23"

The separation layer 23 is fixed between the first pressure sensor 22a and the second pressure sensor 22b via an adhesive layer (not shown). The separation layer 23 is deformable in accordance with the external force. The separation layer 23 has gap portions 33 and includes a plurality of pole portions 34 that is formed by the gap portions 33 and extends in the perpendicular direction. The gap portions 33 are provided in the shape of grooves not penetrating the separation layer 23 in the perpendicular direction on a back surface side of the separation layer 23 (on a side of the second pressure sensor 22b).

The separation layer 23 includes a filling layer 31 (first layer) of a filling structure without the gap portions 33 on the front side (on a side of the first pressure sensor 22a). Further, the separation layer 23 includes a pole layer 32 (second layer) having the gap portions 33 and having the plurality of pole portions 34 formed by the gap portions 33 on the rear side (on the side of the second pressure sensor 22b).

Each of the plurality of pole portions 34 has a shape the thickness of which is not constant and different in the perpendicular direction. In the examples shown in FIGS. 2 and 4, the plurality of pole portions 34 is formed to become gradually thinner from the front side (on the side of the first pressure sensor 22a) to the rear side (on the side of the second pressure sensor 22b) in the perpendicular direction. Specifically, in the examples shown in FIGS. 2 and 4, each of the plurality of pole portions 34 has an inverted truncated square pyramid shape. It should be noted that the pole portion 34 may be formed in a shape such as an inverted truncated cone shape, an inverted triangular cone shape, an inverted pentagonal frustum shape, and an inverted hexagonal frustum shape.

The pole portions 34 are arranged vertically and horizontally regularly. The pole portions 34 are respectively provided at positions corresponding to the sensing portions 28 in the perpendicular direction, and therefore the gap portions 33 for forming the pole portions 34 are provided at positions not corresponding to the sensing portions 28 in the perpendicular direction. The number of pole portions 34 is the same as the number of sensing portions 28b in the second pressure sensor 22b, and is 5×5 (vertical×horizontal), 25 in total. It should be noted that the number of pole portions 34 can be modified as appropriate.

The thickness of the separation layer 23 is, for example, approximately 1000 μm to 5000 μm. The height of the pole portion 34 in the perpendicular direction (i.e., a depth of the gap portion 33 in the groove shape) is 20% or more, 25% or more, 30% or more, 35% or more, 40% or more, 45% or more, or the like of the thickness of the separation layer 23. It should be noted that the height of the pole portion 34 is not problematic if it is tall (e.g., 100% of the thickness of the separation layer 23), but there is a possibility that the pole portion 34 cannot effectively function if it is too short (e.g., lower than 20% of the thickness of the separation layer 23).

An area (in the in-plane direction) of lower surfaces of the pole portions 34 (portions held in contact with the second pressure sensor 22b) is set in accordance with the sensing portions 28b of the second pressure sensor 22, and for example, is substantially the same as the area of the sensing portions 28b.

The separation layer 23 is typically constituted by viscoelastic material having viscoelastic characteristics. Examples of a material that is used for the separation layer 23 can include silicone gel, urethane gel, synthetic rubber, and foam.

Respective Examples in Separation Layer 23

Figure 5:
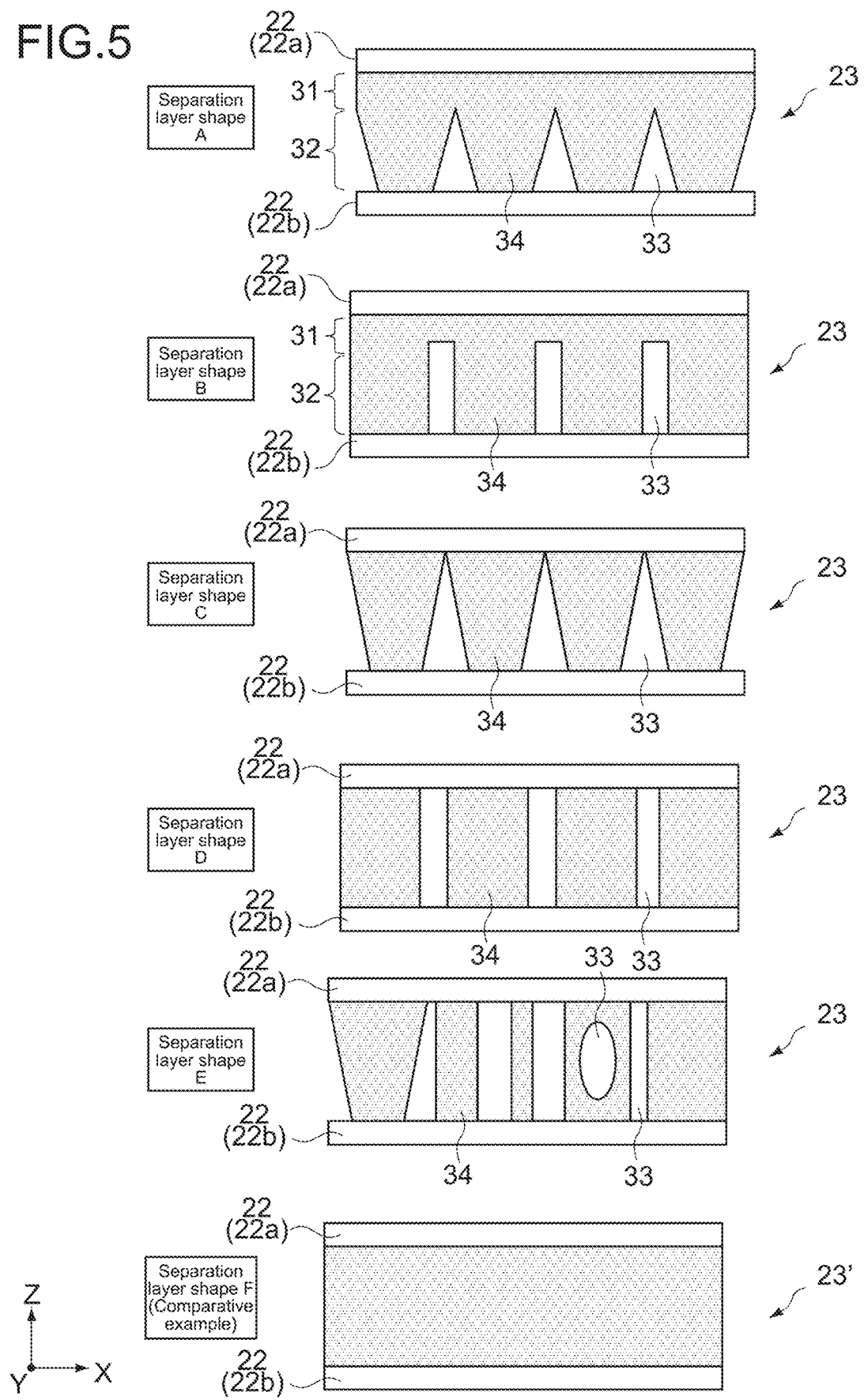
FIG. 5 A diagram showing respective examples in a shape of the separation layer.

Next, respective examples of a shape of the separation layer 23 will be described. FIG. 5 is a diagram showing the respective examples of the shape of the separation layer 23. FIG. 5 shows six patterns of shapes A to F as to the shape of the separation layer 23. It should be noted that FIG. 5 is depicted simplifying the first pressure sensor 22a and the second pressure sensor 22b.
(Shape A)

The shape A is a shape already described with reference to FIGS. 2 and 4.
(Shape B)

In the shape B, as in the shape A, the gap portions 33 are provided in the shape of grooves not penetrating the separation layer 23 in the perpendicular direction on the back surface side of the separation layer 23 (on the side of the second pressure sensor 22b). Further, in the shape B, as in the shape A, a two-layer structure of the filling layer 31 and the pole layer 32 is provided.

In the shape A, the thickness of the pole portion 34 is different in the perpendicular direction while in the shape B, the thickness of the pole portion 34 is the same in the perpendicular direction. Specifically, in the shape B, the shape of the pole portion 34 includes a quadratic prism shape. It should be noted that the shape of the pole portion 34 may be formed in a shape such as a columnar shape, a triangular prism shape, a pentagonal prism shape, and a hexagonal prism shape.

It should be noted that as in the pole portions 34 in the shape A, the pole portions 34 in the shape B are typically provided at positions corresponding to the sensing portions 28b of the second pressure sensor 22b in the perpendicular direction. It should be noted that the same applies to the shapes C to E.
(Shape C)

In the shapes A and B, the gap portions 33 have the shape of the grooves not penetrating the separation layer 23 in the perpendicular direction while in the shape C, the gap portions 33 have the shape of the holes penetrating the separation layer 23 in the perpendicular direction. In this relationship, in the shape C, the height of the pole portion 34 is taller than those of the shape A and the shape B and the height of the pole portion 34 is identical to the thickness of the separation layer 23. That is, the height of the pole portion 34 is 100% with respect to the thickness of the separation layer 23.

Further, in the shapes A and B, the separation layer 23 has the two-layer structure of the filling layer 31 and the pole layer 32 while in the shape C, the filling layer 31 is not provided and the separation layer 23 has a single-layer structure of the pole layer 32.

In the shape C, the shape of the pole portion 34 is an inverted truncated square pyramid. However, the shape of the pole portion 34 may be an inverted truncated cone shape, an inverted triangular cone shape, an inverted pentagonal frustum shape, an inverted hexagonal prism shape, or the like.
(Shape D)

In the shape D, as in the shape C, the gap portions 33 have the shape of holes penetrating the separation layer 23 in the perpendicular direction. Further, in the shape D, as in the shape C, the height of the pole portion 34 is identical to the thickness of the separation layer 23 and the height of the pole portion 34 is 100% with respect to the thickness of the separation layer 23.

In the shape C, the thickness of the pole portion 34 is different in the perpendicular direction while in the shape D, the pole portion 34 has the same thickness in the perpendicular direction. Specifically, in the shape D, the shape of the pole portion 34 includes a quadratic prism shape. It should be noted that the shape of the pole portion 34 may be formed in a shape such as a columnar shape, a triangular prism shape, a pentagonal prism shape, and a hexagonal prism shape.
(Shape E)

The shape E shows an example of a combination of the shapes A to D and the like. That is, the shapes A to D and the like can be combined as appropriate.

In the shape E, the pole portion 34 on the leftmost-hand side corresponds to the pole portion 34 in the shape C. Four other pole portions 34 correspond to the pole portions 34 in the shape D but they have different thicknesses. It should be noted that the second pole portion 34 from the right has a circular gap portion 33 at a center position in the perpendicular direction (the gap portion 33 is in contact with neither the first pressure sensor 22a nor the second pressure sensor 22b).
(Shape F)

The shape F is a Comparative Example without the gap portions 33, and a separation layer 23' is a filling structure as the whole.
(Shape in Planar View)

Figure 6:
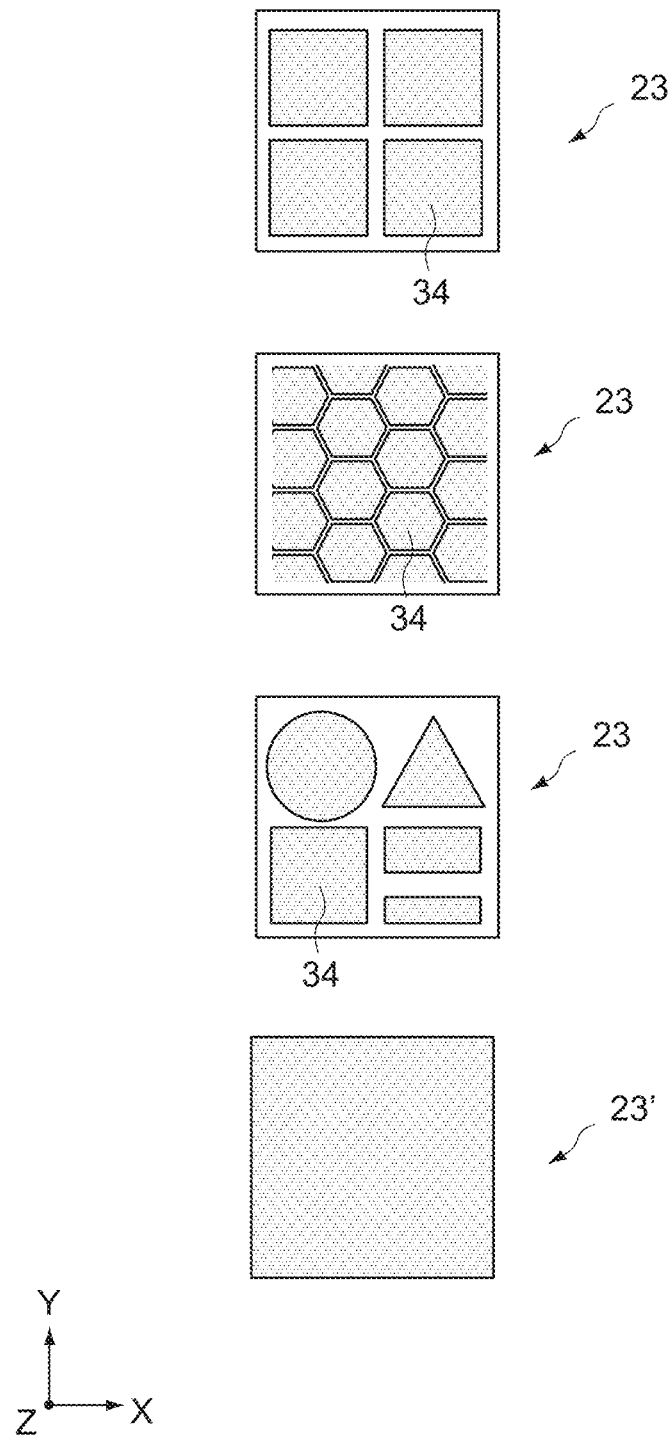
FIG. 6 A diagram of the separation layer as it is viewed from a back surface side, which is a diagram showing each pattern of a shape of a pole portion in a plan view.

FIG. 6 is a diagram of the separation layer 23 as it is viewed from the back surface side, and is a diagram showing respective patterns of the shape of the pole portions 34 in the plan view.

The uppermost diagram in FIG. 6 shows a state in which the pole portions 34 have a quadratic prism shape. Further, the second diagram from above in FIG. 6 shows a state in which the pole portions 34 have a hexagonal prism shape (honeycomb teeth structure). Further, the third diagram from above in FIG. 6 shows a state in which the pole portions 34 in different shapes (cylinder, quadrangular prism, a triangular prism, and the like) are combined. It should be noted that the lowermost diagram in FIG. 6 corresponds to a Comparative Example without the gap portions 33.
<Detection Principle of Shear Force Fs (Force in In-Plane Direction)>

Next, a detection principle of the shear force Fs (force in the in-plane direction) will be described.

Figure 7:
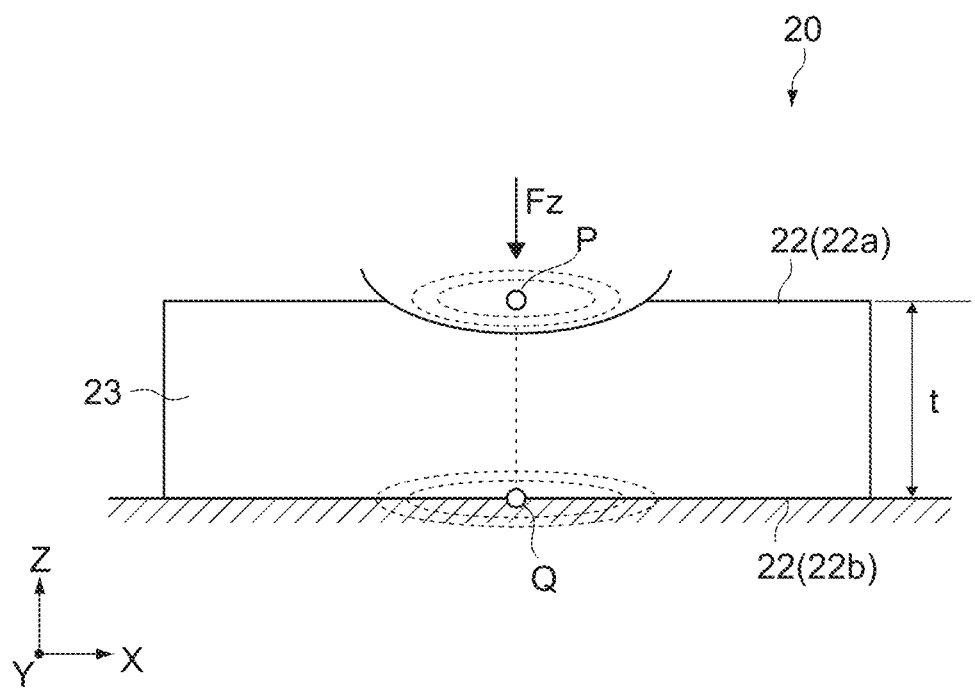
FIG. 7 A diagram representing a state in which load Fz is applied downward in the perpendicular direction to the sensor as a model.
Figure 8:
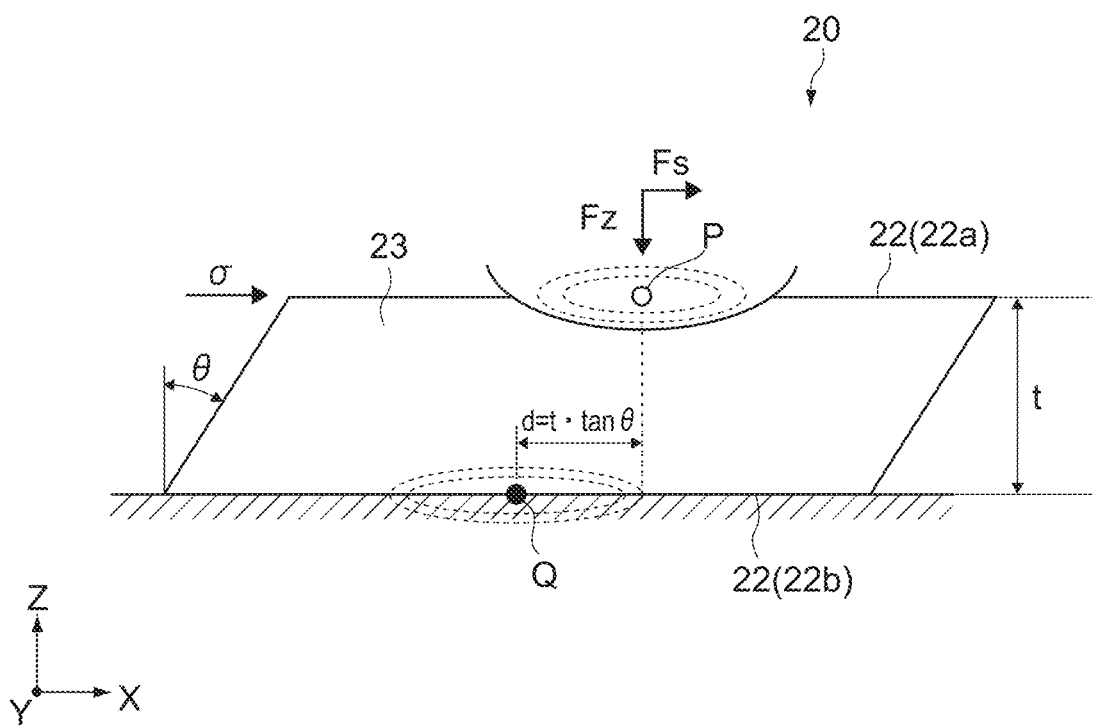
FIG. 8 A diagram representing a state in which the shear force Fs is applied in the in-plane direction as a model with the load Fz in the perpendicular direction applied to the sensor.

FIG. 7 is a diagram representing a state in which load Fz is applied downward in the perpendicular direction to the sensor 20 as a model. FIG. 8 is a diagram representing a state in which the shear force Fs is applied in the in-plane direction as a model with the load Fz in the perpendicular direction applied to the sensor 20. It should be noted that in FIGS. 7 and 8, contour lines of detected pressures are shown as the broken-line circular shapes.

As shown in FIG. 7, in a case where the load Fz is applied downward in the perpendicular direction to the sensor 20, a pressure center position P in the in-plane direction that is detected by the first pressure sensor 22a is identical to the pressure center position Q in the in-plane direction that is detected by the second pressure sensor 22b. It should be noted that the pressure center position means a position in the in-plane direction that corresponds to the highest pressure in a detected pressure distribution.

On the other hand, as shown in FIG. 8, in a case where the shear force Fs is applied in the in-plane direction while the load Fz is applied downward in the perpendicular direction to the sensor 20, the pressure center position P in the in-plane direction that is detected by the first pressure sensor 22a is not identical to the pressure center position Q in the in-plane direction that is detected by the second pressure sensor 22b.

The separation layer 23 deforms in accordance with the shear force Fs applied in the in-plane direction. At this time, the separation layer 23 generates shear stress σ corresponding to the shear force Fs. Here, the rigidity rate of the separation layer 23 is denoted by G and the thickness of the separation layer 23 is denoted by t. Further, a difference between the pressure center position P of the first pressure sensor 22a and the pressure center position Q of the second pressure sensor 22b is denoted by d (=t×tan θ). In this case, the shear stress σ (shear force Fs) is represented by the following equation.

$$\sigma = Fs = G \times d$$

Here, the rigidity rate G of the separation layer 23 is known on the right side in the equation. Therefore, when a difference d between the pressure center position P in the in-plane direction of the first pressure sensor 22a and the pressure center position Q in the in-plane direction of the second pressure sensor 22b is determined on the basis of them, shear stress Fs, i.e., a force in the in-plane direction can be detected.

<Evaluation of Variation in Detection Sensitivity of Shear Force Fs>

Next, evaluation of variations in the detection sensitivity of the shear force Fs in the separation layer 23' according to the comparative example and the separation layer 23 according to the present embodiment will be described.

Comparative Example

Figure 9:
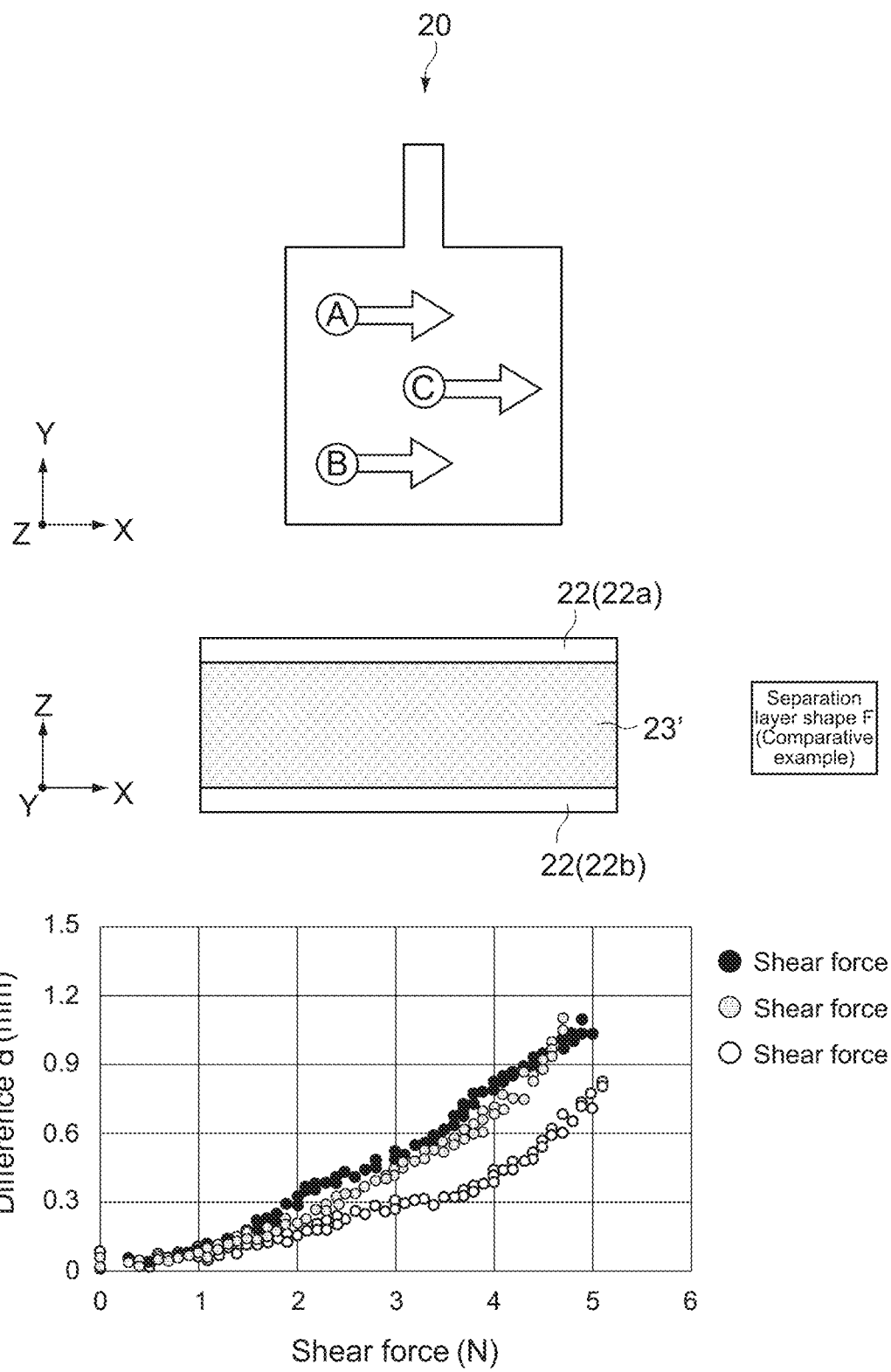
FIG. 9 A diagram showing evaluation of a variation in the detection sensitivity of the shear force Fs in the separation layer according to the comparative example.

First of all, evaluation of a variation in the detection sensitivity of the shear force Fs in the separation layer 23' according to the comparative example will be described. FIG. 9 is a diagram showing the evaluation of the variation in the detection sensitivity of the shear force Fs in the separation layer 23' according to the comparative example. A diagram on the upper side of FIG. 9 is a top view showing the sensor 20 according to the comparative example, and shows points and directions in the in-plane direction in which the shear force Fs is applied. A diagram at the center of FIG. 9 is a side view showing the sensor 20 according to the comparative example.

As shown in a diagram at the center of FIG. 9, the separation layer 23' according to the comparative example does not have the gap portions 33 and is the filling structure as a whole. Further, as shown in the figure on the upper side of FIG. 9, in this evaluation test, the load Fz in the perpendicular direction was applied and the shear force Fs was applied in the X-axis direction to a point A near the upper left angle, a point B near the lower left angle, and a point C at the center in the in-plane direction of the sensor 20 at different timings.

A diagram on the lower side of FIG. 9 is a diagram when the shear force Fs was changed and the difference d between the pressure center position P and the pressure center position Q was measured at each of the point A, the point B, and the point C.

In the diagram on the lower side of FIG. 9, focus is put on a position at which the shear force Fs is 3N. When the shear force Fs of 3N is applied to the point A and the point B near the corners in the in-plane direction, a difference d of about 0.5 mm is generated at the pressure center position P of the first pressure sensor 22a and the pressure center position Q of the second pressure sensor 22b. In this regard, when the shear force Fs of 3N is applied to the point C near the center in the in-plane direction, only a difference of about 0.3 mm is generated at the pressure center position P of the first pressure sensor 22a and the pressure center position Q of the second pressure sensor 22b.

That is, although the same shear force Fs is applied, the difference d is smaller at the point C near the center as compared to the point A and the point B near the corners. In this case, it is assumed that at the point A, the point B, and the point C, shear force Fs is calculated on the basis of each difference d. In this case, although the same shear force Fs is applied, the shear force Fs determined for the point C is smaller than the shear force Fs determined for each of the point A and the point B. In this manner, in the comparative example, the detection sensitivity of the shear force Fs at the respective points in the in-plane direction is different.

It is because, in the comparative example, there is a difference in the shear stress σ generated by the separation layer 23' at the respective points even when the same shear force Fs is applied to the respective points as the separation layer 23' is the filling structure as a whole. That is, near the center in the in-plane direction, the separation layer 23' has larger shear stress σ with respect to the shear force Fs as compared to that near a periphery in the in-plane direction, and it is unlikely to deform against the shear force Fs. In contrast, near a periphery in the in-plane direction, the separation layer 23' has smaller shear stress σ with respect to the shear force Fs as compared to that near the center in the in-plane direction, and it is likely to deform against the shear force Fs.

It should be noted that in the diagram on the lower side of FIG. 9, the gradient of the graph shows the detection sensitivity of the shear force Fs at each point. That is, as the gradient becomes larger, the detection sensitivity of the shear force Fs becomes better, and as the gradient becomes smaller, the detection sensitivity of the shear force Fs becomes worse.

As it will be understood from the diagram on the lower side of FIG. 9, at the point C near the center, the detection sensitivity of the shear force Fs is worse as compared to the point A and the point B near the corners. Further, at the point A and the point B near the corners, the detection sensitivity of the shear force Fs is relatively high as compared to the point C near the center, but this detection sensitivity is insufficient as the detection sensitivity of the shear force Fs. That is, in the comparative example, the detection sensitivity of the shear force Fs itself is bad.

Further, in the comparative example, there is also a problem in that the pressure detection sensitivity of the second pressure sensor 22b is bad as the separation layer 23' is the filling structure as a whole. That is, in the comparative example, since the separation layer 23' is the filling structure as a whole, when the load Fz in the perpendicular direction is applied, the entire separation layer 23' serves as a buffer layer, and the force is unlikely to be transmitted to the second pressure sensor 22b. Therefore, the position of the pressure center position Q that is detected by the second pressure sensor 22b is inaccurate, and there is a possibility that the shear force Fs cannot be accurately measured.

As it will be understood from the above description, the comparative example has the following problems 1 to 3.
1. There is a variation in the in-plane direction in the detection sensitivity of the shear force Fs.
2. The detection sensitivity of the shear force Fs itself is bad.
3. The pressure detection sensitivity of the second pressure sensor 22b is bad.

In order to cope with the problems above, in the present embodiment, the gap portions 33 are formed in the separation layer 23 and the separation layer 23 has a predetermined shape (e.g., a shape having the pole portions 34).

Present Embodiment

Figure 10:
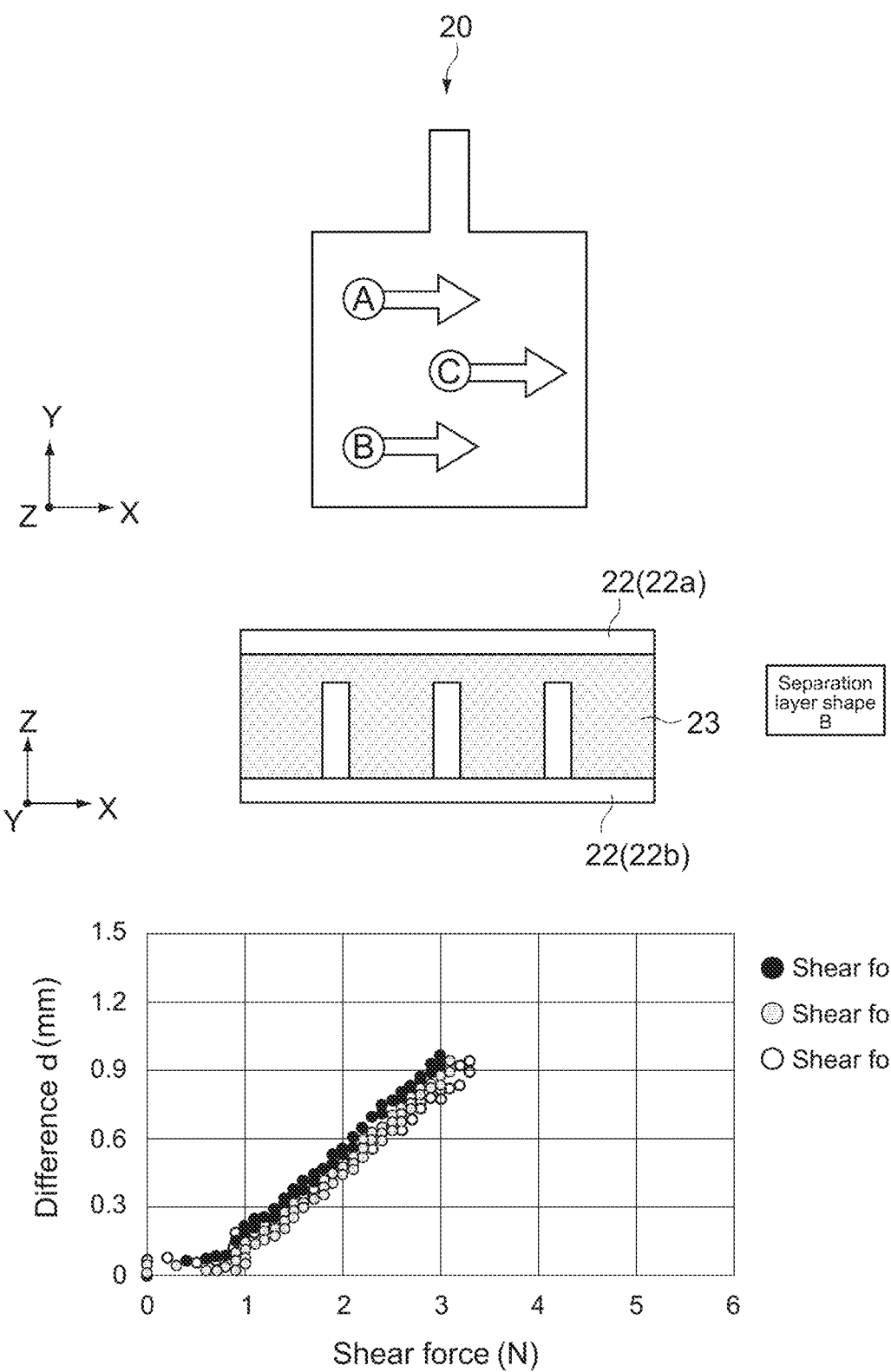
FIG. 10 A diagram showing evaluation of a variation in the detection sensitivity of the shear force Fs in the separation layer according to the present embodiment.

Next, evaluation of a variation in the detection sensitivity of the shear force Fs in the separation layer 23 according to the present embodiment will be described. FIG. 10 is a diagram showing the evaluation of the variation in the detection sensitivity of the shear force Fs in the separation layer 23 according to the present embodiment. A diagram on the upper side of FIG. 10 is a top view showing the sensor 20 according to the present embodiment, and shows points and directions in the in-plane direction in which the shear force Fs is applied. A diagram at the center of FIG. 10 is a side view showing the sensor 20 according to the present embodiment.

As shown in a diagram at the center of FIG. 10, in this evaluation test, the separation layer 23 in the shape B was used as the separation layer 23 according to the present embodiment. The separation layer 23 in the shape B has a two-layer structure of the filling layer 31 on the front side and the pole layer 32 on the rear side with the gap portions 33 in the shape of the grooves. Further, the pole portion 34 in the pole layer 32 has a quadratic prism shape.

Further, as shown in the figure on the upper side of FIG. 10, in this evaluation test, as in the evaluation test in the comparative example, the load Fz in the perpendicular direction was applied and the shear force Fs was applied in the X-axis direction to the point A near the upper left angle, the point B near the lower left angle, and the point C at the center in the in-plane direction of the sensor 20 at different timings.

The diagram on the lower side of FIG. 10 is a diagram when the shear force Fs was changed and the difference d between the pressure center position P and the pressure center position Q was measured at each of the point A, the point B, and the point C.

As it will be understood from the diagram on the lower side of FIG. 10, when the same shear force Fs was applied, the same difference d (the difference d between the pressure center position P and the pressure center position Q) was generated at each of the point A, the point B, and the point C. It means that the detection sensitivity of the shear force Fs is uniform in the in-plane direction.

In addition, as it will be understood from comparison of the diagram on the lower side of FIG. 10 with the diagram on the lower side of FIG. 8, the gradient of the graph at each point in the present embodiment is larger than the gradient of the graph at each point according to the comparative example. It means that in the present embodiment, the detection sensitivity of the shear force Fs is higher than that of the comparative example.

Here, why the detection sensitivity of the shear force Fs is uniform in the in-plane direction and the detection sensitivity of the shear force Fs is improved is that the gap portions 33 are provided in the separation layer 23. That is, in the present embodiment, since deformability (shear stress σ) of the separation layer 23 against the shear force Fs at each point in the in-plane direction is uniform due to the provision of the gap portions 33 in the separation layer 23, the detection sensitivity of the shear force Fs is uniform in the in-plane direction in the present embodiment.

It will be described more specifically. In the present embodiment, the gap portions 33 are provided. Therefore, when the shear force Fs is applied, the separation layer 23 locally deforms at a position corresponding to a point in the in-plane direction at which the shear force Fs is generated, and the deformation is not transmitted so much to a portion other than the local portion. The local deformability (shear stress σ) is uniform irrespective of the point in the in-plane direction. Therefore, in the present embodiment, the detection sensitivity of the shear force Fs is uniform in the in-plane direction.

Further, in the present embodiment, since the gap portions 33 are provided in the separation layer 23, the separation layer 23 easily deforms against the shear force Fs at each point in the in-plane direction (the shear stress σ is smaller). Thus, the detection sensitivity of the shear force Fs is improved.

Further, in the present embodiment, the pole portions 34 formed by the gap portions 33 are provided at the positions corresponding to the sensing portions 28 of the second pressure sensor 22b. Therefore, when the load Fz in the perpendicular direction is applied to the sensor 20, the pole portions 34 locally push the positions corresponding to the sensing portions 28 in the second pressure sensor 22b, and therefore the force can be efficiently transmitted to the second pressure sensor 22b. Therefore, if the load Fz in the perpendicular direction is small, the pressure center position Q can be accurately detected by the second pressure sensor 22b, and the shear force Fs can be accurately measured.

It should be noted that with the two-layer structure of the filling layer 31 and the pole layer 32 as the shape of the separation layer 23 like the shape A or the shape B, the pole layer 32 may be constituted by a relatively hard material as compared to the filling layer 31. In this case, when the load Fz in the perpendicular direction is applied to the sensor 20, the pole portions 34 in the relatively hard pole layer 32 locally push the positions corresponding to the sensing portions 28 in the second pressure sensor 22b, and therefore the force can be more efficiently transmitted in the second pressure sensor 22b.

Respective Examples and Respective Comparative Examples of Layer 23

Next, respective examples and respective comparative examples of the separation layer 23 will be described. FIG. 11 is a diagram showing the respective examples and the respective comparative examples of the separation layer 23.

In the respective examples and the respective comparative examples, the sensors 20 including the separation layers 23 different in thickness, shape, and the like were prepared, and with respect to each of the sensors 20, the detection sensitivity of the shear force Fs in the in-plane direction, the variation in the detection sensitivity of the shear force Fs in the in-plane direction, and the resolution of the detection sensitivity of the shear force Fs in the in-plane direction were respectively evaluated.

Figure 12:
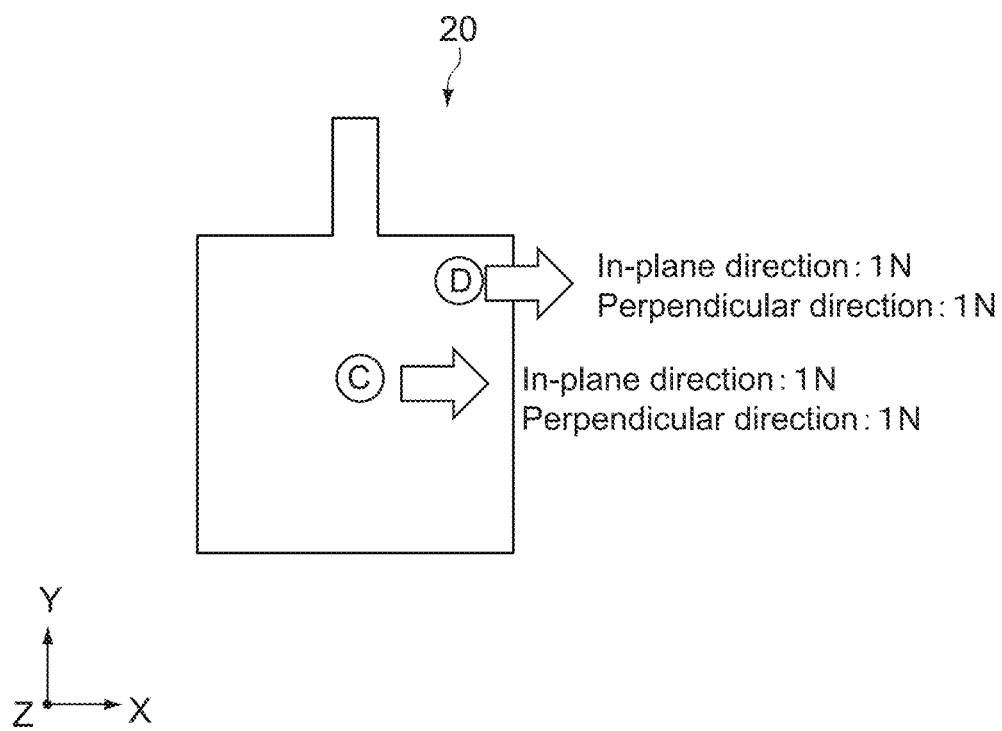
FIG. 12 A diagram showing a state when the detection sensitivity of the shear force Fs and a variation in the detection sensitivity of the shear force Fs are evaluated.

FIG. 12 is a diagram showing a state when the detection sensitivity of the shear force Fs and a variation in the detection sensitivity of the shear force Fs were evaluated. First of all, in evaluation of the detection sensitivity of the shear force Fs, the detection sensitivity (S/N) of the shear force Fs was measured by applying, through a keystroke element with Φ6 in an evaluation apparatus, the shear force Fs of 1N in the in-plane direction in a state in which the load Fz of 1N is applied downward in the perpendicular direction with respect to the point C at the center. That is, the detection sensitivity of the shear force Fs for the point C at the center was used as a representative of the detection sensitivity of the sensor 20.

Further, in evaluation of the variation of the detection sensitivity of the shear force Fs in the in-plane direction, the detection sensitivity (S/N) of the shear force Fs was measured by applying, through the keystroke element with Φ6 in the evaluation apparatus, the shear force Fs of 1N in the in-plane direction in a state in which the load Fz of 1N is applied downward in the perpendicular direction with respect to the point D near the right corner. Then, a percentage of the detection sensitivity for the point D ((detection sensitivity for point D/detection sensitivity for point C)×100) using the detection sensitivity for the point C at the center as a base was determined, and this percentage was used as the evaluation value of the variation of the shear force Fs in the in-plane direction. It should be noted that regarding the evaluation value of the variation, the variation becomes smaller as it becomes closer to 100% and the detection sensitivity in the in-plane direction is more uniform.

Figure 13:
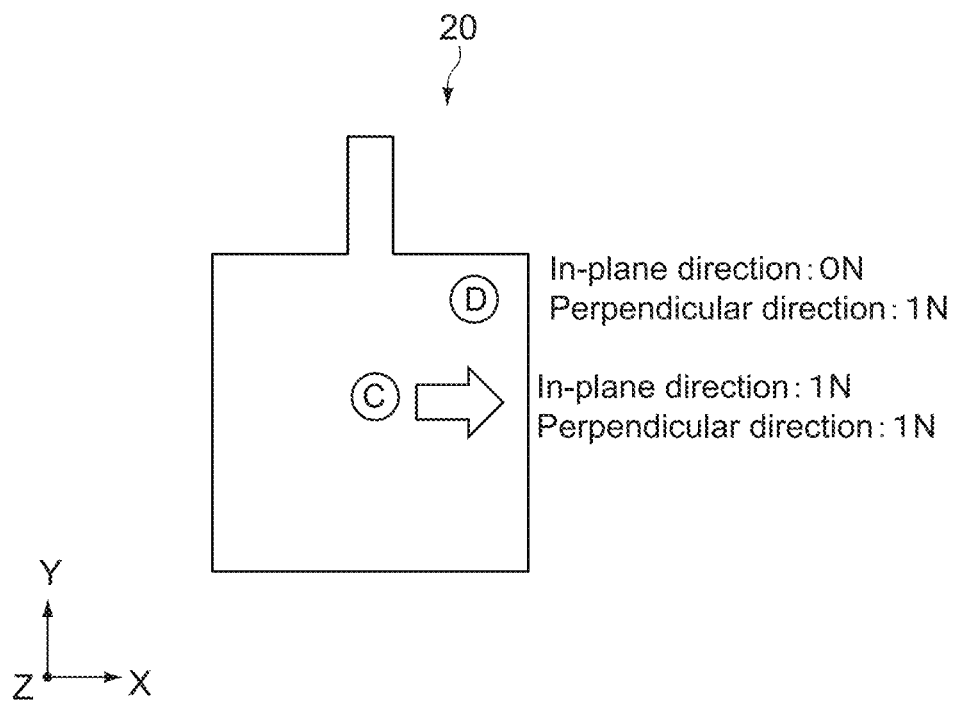
FIG. 13 A diagram showing a state when the resolution of the detection sensitivity of the shear force Fs in the in-plane direction is evaluated.

FIG. 13 is a diagram showing a state when the resolution of the detection sensitivity of the shear force Fs in the in-plane direction was evaluated. In the evaluation of the resolution, first of all, the load Fz of 1N is applied through the keystroke element with Φ6 in the evaluation apparatus downward in the perpendicular direction at the point C at the center and the point D near the right corner at the same time. After that, the shear force Fs of 1N is applied in the in-plane direction only at the point C at the center. A percentage of the detection sensitivity of the shear force Fs for the point D (detection sensitivity for point D/detection sensitivity for point C)×100) using the detection sensitivity of the shear force Fs for the point C at the center at this time as a base was determined, and this percentage was used as the evaluation value of the resolution in the in-plane direction.

It should be noted that in a case where the shear force Fs is applied only at the point C at the center in a state in which the load Fz in the perpendicular direction is applied to the point C and the point D at the same time, it is ideal that the shear force Fs is detected only at the point C and any shear force Fs is not detected at the point D, and the highest resolution is obtained in this case. Therefore, regarding the evaluation value of the resolution, the resolution is higher as it is closer to 0%.

It should be noted that as it will be understood from the description here, the resolution of the detection sensitivity of the shear force Fs in the in-plane direction is, in a case where it is necessary to detect the shear force Fs at two or more points, an indication as to whether, when the shear force Fs is applied to a certain point, the shear force Fs can be properly detected only at that point while the shear force Fs does not affect the other peripheral point(s).

Example 1

In Example 1, the thickness of the separation layer 23 was 2000 μm, and silicone gel having hardness that was penetration of 100 degrees was used as the material of the separation layer 23. Further, in Example 1, the separation layer 23, which was the separation layer 23 in the shape D (see FIG. 5), in which the pole portions 34 were arranged in the form of vertically and horizontally 3×3 was used. It should be noted that as for the material of the separation layer 23, the same material was used in the respective examples and the respective comparative examples (silicone gel having the hardness that was penetration of 100 degrees).

In this Example 1, the detection sensitivity of the shear force Fs was 4.5, and the variation in the detection sensitivity of the shear force Fs in the in-plane direction was 130%. Further, in Example 1, the resolution of the detection sensitivity of the shear force Fs in the in-plane direction was 50%.

Example 2

In Example 2, the thickness of the separation layer 23 was 4000 μm. Further, in Example 2, the separation layer 23, which was the separation layer 23 in the shape D (see FIG. 5), in which the pole portions 34 were arranged in the form of vertically and horizontally 3×3 was used.

In this Example 2, the detection sensitivity of the shear force Fs was 7.5, and the variation in the detection sensitivity of the shear force Fs in the in-plane direction was 130%. Further, in Example 2, the resolution of the detection sensitivity of the shear force Fs in the in-plane direction was 50%.

Here, comparing Example 1 with Example 2, their separation layers 23 have the same material and shape and the separation layers 23 have different thicknesses. In Example 2, since the thickness of the separation layer 23 is larger than Example 1, the detection sensitivity of the shear force Fs is higher than Example 1.

Example 3

In Example 3, the thickness of the separation layer 23 was 4000 μm. Further, in Example 3, the separation layer 23, which was the separation layer 23 in the shape C (see FIG. 5), in which the pole portions 34 were arranged in the form of vertically and horizontally 3×3 was used.

In this Example 3, the detection sensitivity of the shear force Fs was 7.5, and the variation in the detection sensitivity of the shear force Fs in the in-plane direction was 130%. Further, in Example 3, the resolution of the detection sensitivity of the shear force Fs in the in-plane direction was 50%.

Here, comparing Example 2 with Example 3, their separation layers 23 have the same thickness and material and the separation layers 23 have different shapes (shape D, shape C). On the other hand, in Examples 2 and 3, the detection sensitivity, variation, and resolution of the shear force Fs each have the same value. Therefore, it can be seen that the separation layers 23 in the shape D and the shape C have substantially the same performance.

Example 4

In Example 4, the thickness of the separation layer 23 was 4000 μm. Further, in Example 4, the separation layer 23, which was the separation layer 23 in the shape B (see FIG. 5), in which the pole portions 34 were arranged in the form of vertically and horizontally 3×3 was used.

In this Example 4, the detection sensitivity of the shear force Fs was 10.0, and the variation in the detection sensitivity of the shear force Fs in the in-plane direction was 100%. Further, in Example 4, the resolution of the detection sensitivity of the shear force Fs in the in-plane direction was 25%.

Here, comparing Example 4 with Example 2 and Example 3, their separation layers 23 have the same thickness and material and the separation layers 23 have different shapes (shape B, shape D, and shape C). On the other hand, in Example 4, as compared to Examples 2 and 3, the detection sensitivity, variation, and resolution of the shear force Fs are respectively enhanced. Therefore, it can be seen that the separation layer 23 in the shape B has higher performance than the separation layers 23 in the shape D and the shape C.

It should be noted that why the separation layer 23 in the shape B has improved performance as compared to the separation layers 23 in the shape D and the shape C is that the separation layer 23 in the shape B has the two-layer structure including the filling layer 31 and the pole layer 32. That is, since in the shape B, the filling layer 31 sufficiently supports the first pressure sensor 22a from below, the first pressure sensor 22a is capable of properly detecting a pressure (pressure center position) based on the external force. In addition, since in the shape B, the pole portions 34 of the pole layer 32 locally push the second pressure sensor 22b, the second pressure sensor 22b is capable of properly detecting a pressure (pressure center position) based on the external force.

Example 5

In Example 5, the thickness of the separation layer 23 was 4000 μm. Further, in Example 5, the separation layer 23, which was the separation layer 23 in the shape A (see FIG. 5), in which the pole portions 34 were arranged in the form of vertically and horizontally 3×3 was used.

In this Example 5, the detection sensitivity of the shear force Fs was 10.0, and the variation in the detection sensitivity of the shear force Fs in the in-plane direction was 100%. Further, in Example 5, the resolution of the detection sensitivity of the shear force Fs in the in-plane direction was 25%.

Here, comparing Example 4 with Example 5, their separation layers 23 have the same thickness and material and the separation layers 23 have different shapes (shape B, shape A). On the other hand, in Examples 4 and 5, the detection sensitivity, variation, and resolution of the shear force Fs each have the same value. Therefore, it can be seen that the separation layers 23 in the shape B and the shape A have substantially the same performance. It should be noted that the separation layers 23 in the shape B and the shape A both have the two-layer structure including the filling layer 31 and the pole layer 32.

Example 6

In Example 6, the thickness of the separation layer 23 was 4000 μm. Further, in Example 6, the separation layer 23, which was the separation layer 23 in the shape A (see FIG. 5), in which the pole portions 34 were arranged in the form of vertically and horizontally 9×9 was used.

In this Example 6, the detection sensitivity of the shear force Fs was 10.0, and the variation in the detection sensitivity of the shear force Fs in the in-plane direction was 100%. Further, in Example 6, the resolution of the detection sensitivity of the shear force Fs in the in-plane direction was 10%.

Here, comparing Example 5 with Example 6, their separation layers 23 have the same thickness, material, and shape, and the finesse of the gap portions in the separation layers 23 is different (the number of divisions of the separation layer 23 is different). On the other hand, in Example 6, as compared to Example 5, the resolution of the shear force Fs is improved. It is because the shear force Fs at a certain point is more unlikely to be transmitted to a peripheral point due to the provision of the finer gap portions 33 in the separation layer 23 in Example 6 as compared to Example 5.

Comparative Example 1

In Comparative Example 1, the thickness of the separation layer 23 was 2000 μm. Further, in Comparative Example 1, the separation layer 23' in the shape F (see FIG. 5), i.e., the separation layer 23' that was entirely the filling structure was used.

In this Comparative Example 1, the detection sensitivity of the shear force Fs was 3.0, and the variation in the detection sensitivity of the shear force Fs in the in-plane direction was 240%. Further, in Comparative Example 1, the resolution of the detection sensitivity of the shear force Fs in the in-plane direction was 100%.

Comparative Example 2

In Comparative Example 2, the thickness of the separation layer 23 was 4000 μm. Further, in Comparative Example 2, the separation layer 23' in the shape F (see FIG. 5), i.e., the separation layer 23' that was entirely the filling structure was used.

In this Comparative Example 2, the detection sensitivity of the shear force Fs was 5.0, and the variation in the detection sensitivity of the shear force Fs in the in-plane direction was 200%. Further, in Comparative Example 2, the resolution of the detection sensitivity of the shear force Fs in the in-plane direction was 80%.

Here, comparing Comparative Example 1 with Comparative Example 2, their separation layers 23 have the same material and shape and the separation layers 23 have different thicknesses. In Comparative Example 2, since the thickness of the separation layer 23 is larger than Comparative Example 1, the detection sensitivity, variation, and resolution of the shear force Fs are each improved than Comparative Example 1, but it is insufficient as the performance.

Comparison of Respective Examples with Respective Comparative Examples

As it will be understood from FIG. 11, in Examples 1 to 6, the detection sensitivity, variation, and resolution of the shear force Fs are each improved as compared to Comparative Examples 1 to 2. It should be noted that why the detection sensitivity of the shear force Fs is improved and the variation in the detection sensitivity of the shear force Fs in the in-plane direction is reduced is as described above (see FIG. 10), that the gap portions 33 are provided in the separation layer 23.

Further, why the resolution in the in-plane direction of the shear force Fs is improved is that the gap portions 33 are provided in the separation layer 23. That is, since the gap portions 33 are provided in the separation layer 23, when the shear force Fs is applied to the sensor 20, the separation layer 23 locally deforms at the position corresponding to the point in the in-plane direction at which the shear force Fs is generated, and the deformation is not transmitted so much to a portion other than the local portion. Therefore, the resolution is improved.

Respective Examples and Respective Comparative Examples in Deformation Layer 27

Next, respective examples and respective comparative examples in the deformation layer 27 will be described. In the present embodiment, as shown in FIG. 2, the first pressure sensor 22a and the second pressure sensor 22b each have a three-layer structure in which the sensor electrode layer 30, the deformation layer 27, and the electrode film layer 26 (reference electrode layer 25) are stacked. In the present embodiment, an improvement in the detection sensitivity to the load Fz in the perpendicular direction is achieved by reducing the thickness of the deformation layer 27 and making the deformation layer 27 softer.

Therefore, in the present embodiment, the thickness of the deformation layer 27 is more than 100 μm and 1000 μm or less and the weight per unit area of the deformation layer 27 is 50 mg/cm² or more.

Hereinafter, referring to respective examples and respective comparative examples in the deformation layer 27, the reason why the thickness and the weight per unit area of the deformation layer 27 is set to be in the above-mentioned ranges will be described.

FIG. 14 is a diagram showing the respective examples and the respective comparative examples of the deformation layer 27 (see FIG. 2). FIG. 14 shows the thickness, weight per unit area, commodity name, and material of the deformation layer 27 in the respective examples and the respective comparative examples. Further, in FIG. 14, the detection sensitivity (S/N) of the sensor 20 in the perpendicular direction when the load Fz of 1 kPa, 100 kPa was applied to the sensor 20 downward in the perpendicular direction is shown.

It should be noted that in the present embodiment, the load Fz to the sensor 20 in the perpendicular direction can be determined on the basis of a pressure value detected by the first pressure sensor 22a, and therefore as to the detection sensitivity of the sensor 20 in the perpendicular direction, the detection sensitivity of the first pressure sensor 22a in the perpendicular direction is used for evaluation.

Figure 15:
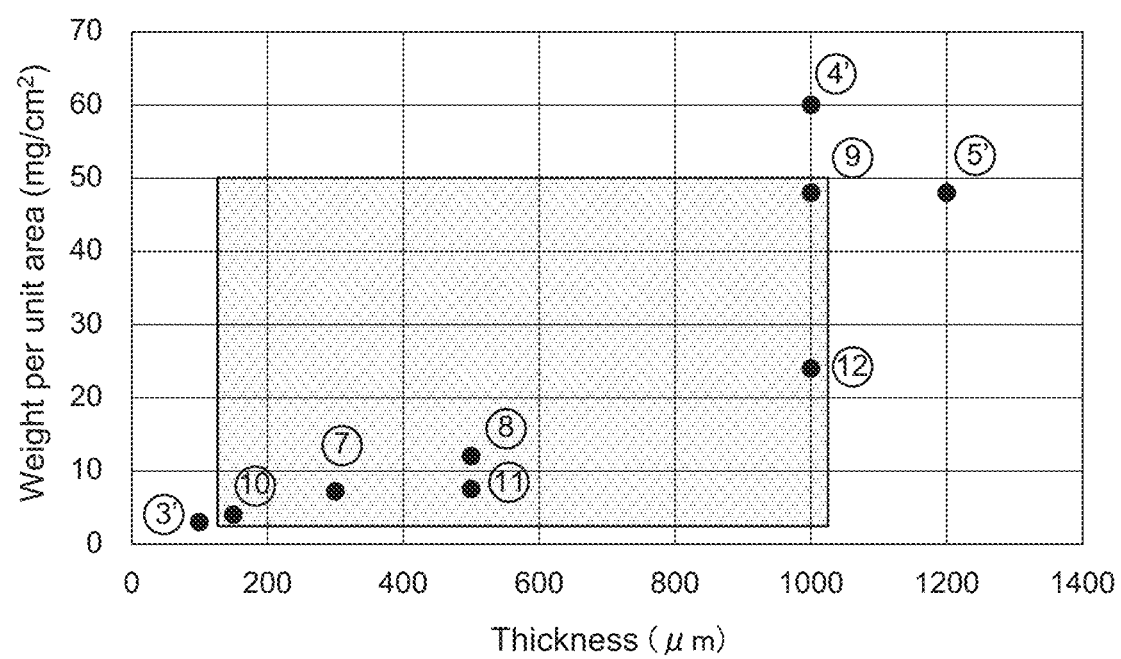
FIG. 15 A diagram showing a relationship between the thickness of the deformation layer and the weight per unit area in the respective examples and the respective comparative examples.

FIG. 15 is a diagram showing a relationship between the thickness and the weight per unit area of the deformation layer 27 in the respective examples and the respective comparative examples.

Example 7

In Example 7, the thickness of the deformation layer 27 was 300 μm, and the weight per unit area was 7.2 mg/cm². Further, in Example 7, PORON (registered trademark)SS-24DP, which is a foam film including polyurethane, was used as the material of the deformation layer 27.

Further, in Example 7, the detection sensitivity of the sensor 20 in the perpendicular direction when the load Fz of 1 kPa and 100 kPa was applied to the sensor 20 in the perpendicular direction was respectively 3.0 and 80. This detection sensitivity was a high value during a low-pressure time and during a high-pressure time.

Example 8

In Example 8, the thickness of the deformation layer 27 was 500 μm, and the weight per unit area was 12 mg/cm². Further, in Example 8, PORON (registered trademark)SS-24DP, which is a foam film including polyurethane, was used as the material of the deformation layer 27.

Further, in Example 8, the detection sensitivity of the sensor 20 in the perpendicular direction when the load Fz of 1 kPa and 100 kPa was applied to the sensor 20 in the perpendicular direction was respectively 2.5 and 120. This detection sensitivity was a high value during a low-pressure time and during a high-pressure time.

Example 9

In Example 9, the thickness of the deformation layer 27 was 1000 μm, and the weight per unit area was 24 mg/cm². Further, in Example 9, PORON (registered trademark) SS-24DP, which is a foam film including polyurethane, was used as the material of the deformation layer 27.

Further, in Example 9, the detection sensitivity of the sensor 20 in the perpendicular direction when the load Fz of 1 kPa and 100 kPa was applied to the sensor 20 in the perpendicular direction was respectively 2.0 and 150. This detection sensitivity was a high value during a low-pressure time and during a high-pressure time.

Example 10

In Example 10, the thickness of the deformation layer 27 was 150 μm, and the weight per unit area was 4 mg/cm². Further, in Example 10, PORON (registered trademark) SS-15DP, which is a foam film including polyurethane, was used as the material of the deformation layer 27.

Further, in Example 10, the detection sensitivity of the sensor 20 in the perpendicular direction when the load Fz of 1 kPa and 100 kPa was applied to the sensor 20 in the perpendicular direction was respectively 4.0 and 200. This detection sensitivity was a high value during a low-pressure time and during a high-pressure time.

Example 11

In Example 11, the thickness of the deformation layer 27 was 500 μm, and the weight per unit area was 7.5 mg/cm². Further, in Example 11, a nanofiber including polyurethane was used as the material of the deformation layer 27.

Further, in Example 11, the detection sensitivity of the sensor 20 in the perpendicular direction when the load Fz of 1 kPa and 100 kPa was applied to the sensor 20 in the perpendicular direction was respectively 2.0 and 60. This detection sensitivity was a high value during a low-pressure time and during a high-pressure time.

Example 12

In Example 12, the thickness of the deformation layer 27 was 1000 μm, and the weight per unit area was 48 mg/cm². Further, in Example 12, PORON (registered trademark)

SR-S-48, which is a foam film including polyurethane, was used as the material of the deformation layer 27.

Further, in Example 12, the detection sensitivity of the sensor 20 in the perpendicular direction when the load Fz of 1 kPa and 100 kPa was applied to the sensor 20 in the perpendicular direction was respectively 1.5 and 80. This detection sensitivity was a high value during a low-pressure time and during a high-pressure time.

Comparative Example 3

In Comparative Example 3, the thickness of the deformation layer 27 was 100 μm, and the weight per unit area was 3 mg/cm². Further, in Example 3, Purecell (registered trademark) S010, which is a foam film including polyurethane, was used as the material of the deformation layer 27.

Further, in Comparative Example 3, the detection sensitivity of the sensor 20 in the perpendicular direction when the load Fz of 1 kPa and 100 kPa was applied to the sensor 20 in the perpendicular direction was respectively 2.0 and 20.

In Comparative Example 3, the detection sensitivity when the load Fz of 1 kPa is applied is not problematic, but the detection sensitivity when the load Fz of 100 kPa is applied is too low. That is, in Comparative Example 3, since the thickness of the deformation layer 27 is 100 μm, which is too small, the deformation amount during a high-pressure time is small and the detection sensitivity is bad. Therefore, in the present embodiment, the thickness of the deformation layer 27 is typically larger than 100 μm (also see the fact that a good result was obtained with the thickness of 150 μm in Example 10).

Comparative Example 4

In Comparative Example 4, the thickness of the deformation layer 27 was 1000 μm, and the weight per unit area was 60 mg/cm². Further, in Example 4, PORON (registered trademark) NU60, which is a foam film including polyurethane, was used as the material of the deformation layer 27.

Further, in Comparative Example 4, the detection sensitivity of the sensor 20 in the perpendicular direction when the load Fz of 1 kPa and 100 kPa was applied to the sensor 20 in the perpendicular direction was respectively 1 or less and 30.

In Comparative Example 4, the detection sensitivity when the load Fz of 1 kPa is applied and the detection sensitivity when the load Fz of 100 kPa is applied are both too low. It is because the weight per unit area is 60 mg/cm² and the weight per unit area is too large in Comparative Example 4, so the deformation layer 27 is too hard. Therefore, in the present embodiment, the weight per unit area of the deformation layer 27 typically is 50 mg/cm² or more (also see the fact that a good result was obtained with the weight per unit area of 48 mg/cm² in Example 12).

Comparative Example 5

In Comparative Example 5, the thickness of the deformation layer 27 was 1200 μm, and the weight per unit area was 48 mg/cm². Further, in Example 5, PORON (registered trademark) MS40, which is a foam film including polyurethane, was used as the material of the deformation layer 27.

Further, in Comparative Example 5, the detection sensitivity of the sensor 20 in the perpendicular direction when the load Fz of 1 kPa and 100 kPa was applied to the sensor 20 in the perpendicular direction was respectively 1 or less and 80.

In Comparative Example 5, the detection sensitivity when the load Fz of 100 kPa is applied is not problematic, but the detection sensitivity when the load Fz of 1 kPa is applied is too low. That is, in Comparative Example 5, since the thickness of the deformation layer 27 is 1200 μm, which is too large, and with the deformation amount during a low-pressure time, the distance between the sensor electrode layer 30 and the reference electrode layer 25 is too long, and the detection sensitivity is bad. Therefore, in the present embodiment, the thickness of the deformation layer 27 typically is 1000 μm or less (also see the fact that a good result was obtained with the thickness of 1000 μm in Example 9, Example 12).

As it can be seen from the above description, when the thickness of the deformation layer 27 is more than 100 μm and 1000 μm or less and the weight per unit area of the deformation layer 27 is 50 mg/cm² or more, the detection sensitivity to the load Fz in the perpendicular direction can be improved.

<Actions, Etc.>

As described above, in the present embodiment, the gap portions 33 are provided in the separation layer 23. With this, the detection sensitivity of the shear force Fs becomes uniform in the in-plane direction, the detection sensitivity of the shear force Fs is improved, and also the resolution in the in-plane direction of the shear force Fs is improved.

That is, in the present embodiment, since the gap portions 33 are provided in the separation layer 23, when the shear force Fs is applied, the separation layer 23 locally deforms at the position corresponding to the point in the in-plane direction at which the shear force Fs is generated, and the deformation is not transmitted so much to a portion other than the local portion. The local deformability (shear stress σ) is uniform irrespective of the point in the in-plane direction. Therefore, in the present embodiment, the detection sensitivity of the shear force Fs is uniform in the in-plane direction. Further, in the present embodiment, due to the characteristic that the separation layer 23 locally deforms at the position corresponding to the point in the in-plane direction at which the shear force Fs is applied, the resolution is also improved.

Further, in the present embodiment, since the gap portions 33 are provided in the separation layer 23, the separation layer 23 easily deforms against the shear force Fs at each point in the in-plane direction (the shear stress σ is smaller), and accordingly, the detection sensitivity of the shear force Fs can be improved.

Further, in the present embodiment, the pole portions 34 formed by the gap portions 33 are provided at the positions corresponding to the sensing portions 28 of the second pressure sensor 22b. Therefore, when the load Fz in the perpendicular direction is applied to the sensor 20, the pole portions 34 locally push the positions corresponding to the sensing portions 28 in the second pressure sensor 22b, and therefore the force can be efficiently transmitted to the second pressure sensor 22b. Therefore, if the load Fz in the perpendicular direction is small, the pressure center position Q can be accurately detected by the second pressure sensor 22b, and the shear force Fs can be accurately measured.

Further, with the two-layer structure of the filling layer 31 and the pole layer 32 with the shape of the separation layer 23 like the shape A or the shape B, the first pressure sensor 22a is capable of properly detecting a pressure (pressure center position) based on the external force in such a manner that the filling layer 31 sufficiently supports the first pressure sensor 22a from below. In addition, since in the shapes A and B, the pole portions 34 of the pole layer 32 locally push the second pressure sensor 22b, the second pressure sensor 22b is capable of properly detecting a pressure (pressure center position) based on the external force.

Further, in a case where the pole layer 32 is constituted by a relatively hard material as compared to the filling layer 31, when the load Fz in the perpendicular direction is applied to the sensor 20, the pole portions 34 in the relatively hard pole layer 32 locally push the positions corresponding to the sensing portions 28 in the second pressure sensor 22b, and therefore the force can be more efficiently transmitted in the second pressure sensor 22b.

Further, in the present embodiment, the thickness of the deformation layer 27 is more than 100 μm and 1000 μm or less and the weight per unit area of the deformation layer 27 is 50 mg/cm$^2$ or more. With this, the detection sensitivity to the load Fz in the perpendicular direction can be improved.

Second Embodiment

Figure 16:
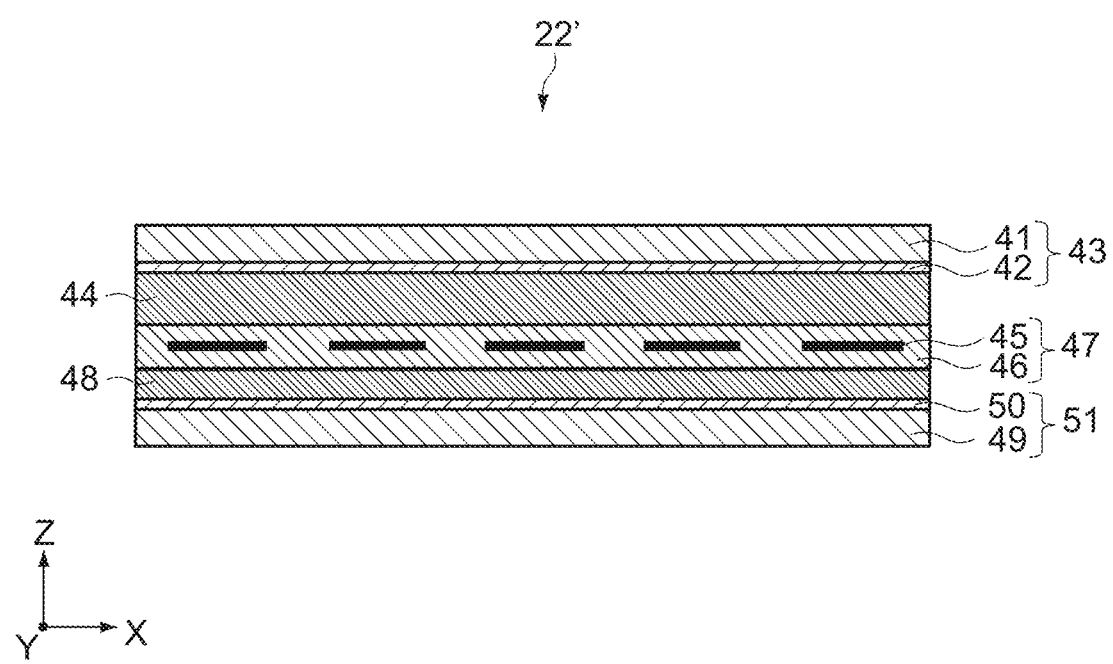
FIG. 16 A cross-sectional view of a pressure sensor according to a second embodiment as it is viewed from the side.

Next, a second embodiment of the present technology will be described. In the second embodiment, another example of the pressure sensor 22 will be described. FIG. 16 is a cross-sectional view of a pressure sensor 22' according to the second embodiment as it is viewed from the side.

The pressure sensor 22' includes a first electrode film layer 43 (first reference electrode layer 42), a sensor electrode layer 45, and a first deformation layer 44 interposed between the electrode film layer 43 (first reference electrode layer 42) and the sensor electrode layer 47. Further, the pressure sensor 22' includes a second electrode film layer 51 (second reference electrode layer 50) and a second deformation layer 48 interposed between the second electrode film layer 51 (second reference electrode layer 50) and the sensor electrode layer 47.

The pressure sensor 22' has a laminate structure in which the second electrode film layer 51 (second reference electrode layer 50), the second deformation layer 48, the sensor electrode layer 47, the first deformation layer 44, the first electrode film layer 43 (first reference electrode layer 42) are stacked in order from the side of the lower layer in the perpendicular direction.

The first electrode film layer 43 includes a film layer 41 and a first reference electrode layer 42. The second electrode film layer 51 includes a film layer 49 and a second reference electrode layer 50. Further, the sensor electrode layer 47 includes a base material 46 and a plurality of sensing portions 45.

The first electrode film layer 43 corresponds to the electrode film layer 26 in the first embodiment and the first deformation layer 44 corresponds to the deformation layer 27 in the first embodiment. Further, the sensor electrode layer 47 corresponds to the sensor electrode layers 30 in the first embodiment. Further, the second electrode film layer 51 has a configuration similar to that of the first electrode film layer 43 except for the point that they are inverted in the upper and lower directions.

The second deformation layer 48 is constituted by a material such as a double-sided tape, silicone gel, urethane gel, synthetic rubber, and foam, for example. The second deformation layer 48 may be constituted by a patterning structure including the pole portion 34 for example. A variety of structures such as a matrix pattern, a stripe pattern, a mesh pattern, a radial pattern, a geometric pattern, and a spiral pattern can be employed as the patterning structure.

Respective Examples and Respective Modified Examples

Next, respective examples and respective comparative examples in the second embodiment will be described. FIG. 17 is a diagram showing the respective examples and the respective comparative examples according to the second embodiment. In FIG. 17, the material, commodity name, thickness, area occupation rate, and weight per unit area of the first deformation layer 44 in the respective examples and the respective comparative examples are shown. Further, in FIG. 17, the material and commodity name of the second deformation layer 48 are shown.

Further, in FIG. 17, the detection sensitivity of the pressure sensor 22' in the perpendicular direction when the load Fz of 10 gf, 1 kgf was applied to the pressure sensor 22 downward in the perpendicular direction is shown. It should be noted that the detection sensitivity of the pressure sensor 22' in the perpendicular direction shown in FIG. 17 is not the sensitivity of the entire sensor 20, and represents the detection sensitivity of the pressure sensor 22' alone.

Example 13

In Example 13, a nanofiber was used as the material of the first deformation layer 44, the thickness of the first deformation layer 44 was 150 μm, and the area occupation rate was 100%. Further, in Example 13, the weight per unit area was 4 mg/cm$^2$. Further, in Example 13, Neofix (registered trademark) 100, which is a double-sided tape, was used as the material of the second deformation layer 48.

In Example 13, the detection sensitivity of the pressure sensor 22' in the perpendicular direction when the load Fz of 10 gf and 1 kgf was applied to the pressure sensor 22' in the perpendicular direction was 10 and 150, respectively. This detection sensitivity was a high value during a low-pressure time and during a high-pressure time.

Example 14

In Example 14, a nanofiber was used as the material of the first deformation layer 44, the thickness of the first deformation layer 44 was 400 μm, and the area occupation rate was 100%. Further, in Example 14, the weight per unit area was 10 mg/cm$^2$. Further, in Example 14, Neofix (registered trademark) 100, which is a double-sided tape, was used as the material of the second deformation layer 48.

In Example 14, the detection sensitivity of the pressure sensor 22' in the perpendicular direction when the load Fz of 10 gf and 1 kgf was applied to the pressure sensor 22' in the perpendicular direction was 40 and 300, respectively. This detection sensitivity was a high value during a low-pressure time and during a high-pressure time.

Example 15

In Example 15, PORON (registered trademark) SR-S-32P, which is a foam film, was used as the material of the first deformation layer 44, the thickness of the first deformation layer 44 was 200 μm, and the area occupation rate was 100%. Further, in Example 15, the weight per unit area was 6 mg/cm$^2$. Further, in Example 15, Neofix (registered trademark) 100, which is a double-sided tape, was used as the material of the second deformation layer 48.

In Example 15, the detection sensitivity of the pressure sensor 22' in the perpendicular direction when the load Fz of 10 gf and 1 kgf was applied to the pressure sensor 22' in the perpendicular direction was 10 and 200, respectively. This detection sensitivity was a high value during a low-pressure time and during a high-pressure time.

Example 16

In Example 16, PORON (registered trademark)SS-32P, which is a foam film, was used as the material of the first deformation layer 44, the thickness of the first deformation layer 44 was 500 μm, and the area occupation rate was 100%. Further, in Example 16, the weight per unit area was 16 mg/cm$^2$. Further, in Example 16, Neofix (registered trademark) 100, which is a double-sided tape, was used as the material of the second deformation layer 48.

In Example 16, the detection sensitivity of the pressure sensor 22' in the perpendicular direction when the load Fz of 10 gf and 1 kgf was applied to the pressure sensor 22' in the perpendicular direction was 30 and 350, respectively. This detection sensitivity was a high value during a low-pressure time and during a high-pressure time.

Example 17

In Example 17, PORON (registered trademark)SS-24P, which is a foam film, was used as the material of the first deformation layer 44, the thickness of the first deformation layer 44 was 300 μm, and the area occupation rate was 100%. Further, in Example 17, the weight per unit area was 7 mg/cm$^2$. Further, in Example 17, Neofix (registered trademark) 100, which is a double-sided tape, was used as the material of the second deformation layer 48.

In Example 17, the detection sensitivity of the pressure sensor 22' in the perpendicular direction when the load Fz of 10 gf and 1 kgf was applied to the pressure sensor 22' in the perpendicular direction was 50 and 350, respectively. This detection sensitivity was a high value during a low-pressure time and during a high-pressure time.

Example 18

In Example 18, PORON (registered trademark)SS-24P, which is a foam film, was used as the material of the first deformation layer 44, the thickness of the first deformation layer 44 was 500 μm, and the area occupation rate was 100%. Further, in Example 18, the weight per unit area was 12 mg/cm$^2$. Further, in Example 18, Neofix (registered trademark) 100, which is a double-sided tape, was used as the material of the second deformation layer 48.

In Example 18, the detection sensitivity of the pressure sensor 22' in the perpendicular direction when the load Fz of 10 gf and 1 kgf was applied to the pressure sensor 22' in the perpendicular direction was 40 and 400, respectively. This detection sensitivity was a high value during a low-pressure time and during a high-pressure time.

Example 19

In Example 19, PORON (registered trademark)SS-15P, which is a foam film, was used as the material of the first deformation layer 44, the thickness of the first deformation layer 44 was 500 μm, and the area occupation rate was 100%. Further, in Example 19, the weight per unit area was 8 mg/cm$^2$. Further, in Example 19, Neofix (registered trademark) 100, which is a double-sided tape, was used as the material of the second deformation layer 48.

In Example 19, the detection sensitivity of the pressure sensor 22' in the perpendicular direction when the load Fz of 10 gf and 1 kgf was applied to the pressure sensor 22' in the perpendicular direction was 50 and 400, respectively. This detection sensitivity was a high value during a low-pressure time and during a high-pressure time.

Example 20

In Example 20, PORON (registered trademark) SR-S-40P, which is a foam film, was used as the material of the first deformation layer 44, the thickness of the first deformation layer 44 was 1000 μm, and the area occupation rate was 100%. Further, in Example 20, the weight per unit area was 40 mg/cm$^2$. Further, in Example 20, Neofix (registered trademark) 100, which is a double-sided tape, was used as the material of the second deformation layer 48.

In Example 20, the detection sensitivity of the pressure sensor 22' in the perpendicular direction when the load Fz of 10 gf and 1 kgf was applied to the pressure sensor 22' in the perpendicular direction was 15 and 200, respectively. This detection sensitivity was a high value during a low-pressure time and during a high-pressure time.

Example 21

In Example 21, PORON (registered trademark) HH48, which is a foam film, was used as the material of the first deformation layer 44, the thickness of the first deformation layer 44 was 1000 μm, and the area occupation rate was 100%. Further, in Example 21, the weight per unit area was 50 mg/cm$^2$. Further, in Example 21, Neofix (registered trademark) 100, which is a double-sided tape, was used as the material of the second deformation layer 48.

In Example 21, the detection sensitivity of the pressure sensor 22' in the perpendicular direction when the load Fz of 10 gf and 1 kgf was applied to the pressure sensor 22' in the perpendicular direction was 10 and 150, respectively. This detection sensitivity was a high value during a low-pressure time and during a high-pressure time.

Example 22

In Example 22, PORON (registered trademark)SS-24P, which is a foam film, was used as the material of the first deformation layer 44, the thickness of the first deformation layer 44 was 500 μm, and the area occupation rate was 100%. Further, in Example 22, the weight per unit area was 12 mg/cm$^2$. Further, in Example 22, PORON (registered trademark) SS-24P, which is a foam film, was used as the material of the second deformation layer 48.

In Example 22, the detection sensitivity of the pressure sensor 22' in the perpendicular direction when the load Fz of 10 gf and 1 kgf was applied to the pressure sensor 22' in the perpendicular direction was 60 and 500, respectively. This detection sensitivity was a high value during a low-pressure time and during a high-pressure time.

Example 23

In Example 23, PORON (registered trademark) SS-24P, which is a foam film, was used as the material of the first deformation layer 44, the thickness of the first deformation layer 44 was 500 μm, and the area occupation rate was 100%. Further, in Example 23, the weight per unit area was 12 mg/cm². Further, in Example 23, as the material of the second deformation layer 48, PORON (registered trademark) SS-32P, which is a foam film, was used.

In Example 23, the detection sensitivity of the pressure sensor 22' in the perpendicular direction when the load Fz of 10 gf and 1 kgf was applied to the pressure sensor 22' in the perpendicular direction was 50 and 600, respectively. This detection sensitivity was a high value during a low-pressure time and during a high-pressure time.

Example 24

In Example 24, PORON (registered trademark) SS-24P, which is a foam film, was used as the material of the first deformation layer 44, the thickness of the first deformation layer 44 was 500 μm, and the area occupation rate was 100%. Further, in Example 24, the weight per unit area was 12 mg/cm². Further, in Example 24, as the material of the second deformation layer 48, silicone gel, FFG-42100-1t was used.

In Example 24, the detection sensitivity of the pressure sensor 22' in the perpendicular direction when the load Fz of 10 gf and 1 kgf was applied to the pressure sensor 22' in the perpendicular direction was 40 and 400, respectively. This detection sensitivity was a high value during a low-pressure time and during a high-pressure time.

Comparative Example 6

In Comparative Example 6, Purecell (registered trademark) S010, which is a foam film, was used as the material of the first deformation layer 44, the thickness of the first deformation layer 44 was 100 μm, and the area occupation rate was 100%. Further, in Comparative Example 6, the weight per unit area was 3 mg/cm². Further, in Comparative Example 6, Neofix (registered trademark) 100, which is a double-sided tape, was used as the material of the second deformation layer 48.

In Comparative Example 6, the detection sensitivity of the pressure sensor 22 in the perpendicular direction when the load Fz of 10 gf and 1 kgf was applied to the pressure sensor 22 in the perpendicular direction was 5 and 100, respectively. This detection sensitivity was a low value during a low-pressure time and during a high-pressure time.

That is, in Comparative Example 6, since the thickness of the first deformation layer 44 is 100 μm, which is too small, the deformation amount during a low-pressure time and during a high-pressure time is small and the detection sensitivity is bad.

Comparative Example 7

In Comparative Example 7, PORON (registered trademark) H48, which is a foam film, was used as the material of the first deformation layer 44, the thickness of the first deformation layer 44 was 1500 μm, and the area occupation rate was 100%. Further, in Comparative Example 7, the weight per unit area was 70 mg/cm². Further, in Comparative Example 7, Neofix (registered trademark) 100, which is a double-sided tape, was used as the material of the second deformation layer 48.

In Comparative Example 7, the detection sensitivity of the pressure sensor 22 in the perpendicular direction when the load Fz of 10 gf and 1 kgf was applied to the pressure sensor 22 in the perpendicular direction was 5 and 30, respectively. This detection sensitivity was a low value during a low-pressure time and during a high-pressure time.

That is, in Comparative Example 7, since the weight per unit area of the first deformation layer 44 is 70, which is too large, the first deformation layer 44 is hard, the deformation amount during a low-pressure time and during a high-pressure time is small, and the detection sensitivity is bad. Further, in Comparative Example 7, since the thickness of the first deformation layer 44 is 1500 μm, which is too large, with the deformation amount during a low-pressure time, the distance between the sensor electrode layer 47 and the first reference electrode layer 42 and the second reference electrode layer 50 is too long, and the detection sensitivity is bad.

Comparative Example 8

In Comparative Example 8, PORON (registered trademark) H48, which is a foam film, was used as the material of the first deformation layer 44, the thickness of the first deformation layer 44 was 1500 μm, and the area occupation rate was 100%. Further, in Comparative Example 8, the weight per unit area was 70 mg/cm². Further, in Comparative Example 8, PORON (registered trademark) H48, which is a foam film, was used as the material of the second deformation layer 48.

In Comparative Example 8, the detection sensitivity of the pressure sensor 22 in the perpendicular direction when the load Fz of 10 gf and 1 kgf was applied to the pressure sensor 22 in the perpendicular direction was 5 and 50, respectively. This detection sensitivity was a low value during a low-pressure time and during a high-pressure time.

That is, in Comparative Example 8, since the weight per unit area of the first deformation layer 44 is 70, which is too large, the first deformation layer 44 is hard, the deformation amount during a low-pressure time and during a high-pressure time is small, and the detection sensitivity is bad. Further, in Comparative Example 8, since the thickness of the first deformation layer 44 is 1500 μm, which is too large, and with the deformation amount during a low-pressure time, the distance between the sensor electrode layer 47 and the first reference electrode layer 42 and the second reference electrode layer 50 is too long, and the detection sensitivity is bad.

As it can be seen from the results shown in FIG. 17, when the thickness of the first deformation layer 44 is more than 100 μm and 1000 μm or less and the weight per unit area of the first deformation layer 44 is 50 mg/cm² or more, the detection sensitivity to the load Fz in the perpendicular direction can be improved.

Third Embodiment

Next, a second embodiment of the present technology will be described. In the third embodiment, still another example of the pressure sensor 22 will be described. As in the pressure sensor 22' according to the second embodiment, the pressure sensor 22' according to the third embodiment has a laminate structure in which the second electrode film layer 51 (second reference electrode layer 50), the second deformation layer 48, the sensor electrode layer 47, the first deformation layer 44, the first electrode film layer 43 (first reference electrode layer 42) are stacked in order from the side of the lower layer in the perpendicular direction.

In the third embodiment, the thickness of the first deformation layer 44 is 100 μm or less and the weight per unit area of the first deformation layer 44 is 3 mg/cm² or less. Further, in the third embodiment, the thickness of the second deformation layer 48 is more than 100 μm and 1000 μm or less and the weight per unit area of the second deformation layer 48 is 50 mg/cm² or more.

In the third embodiment, by configuring the first deformation layer 44 and the second deformation layer 48 in the above-mentioned ranges, the detection sensitivity during a low-pressure time is improved by the first deformation layer 44 while the detection sensitivity during a low-pressure time and during a high-pressure time is improved by the second deformation layer 48.

Respective Examples and Respective Modified Examples

Next, respective examples and respective comparative examples in the third embodiment will be described. FIG. 18 is a diagram showing the respective examples and the respective comparative examples according to the third embodiment. In FIG. 18, the thickness, weight per unit area, commodity name, and material of the first deformation layer 44 in the respective examples and the respective comparative examples are shown. Further, in FIG. 18, the thickness, weight per unit area, commodity name, and material of the second deformation layer 48 are shown.

Further, in FIG. 18, to the sensor 20 downward in the perpendicular direction 10 kPa, the detection sensitivity of the sensor 20 when the load Fz of 100 kPa was applied in the perpendicular direction is shown. Further, in FIG. 18, the displacement detection sensitivity when the displacement was 5 μm is shown.

Example 25

In Example 25, the thickness of the first deformation layer 44 was 100 μm, and the weight per unit area was 2.5 mg/cm². Further, in Example 25, a nanofiber including polyurethane was used as the material of the first deformation layer 44.

Further, in Example 25, the thickness of the second deformation layer 48 was 500 μm, and the weight per unit area was 12 mg/cm². Further, in Example 25, as the material of the second deformation layer 48, PORON (registered trademark) SS-24DP, which is a foam film including polyurethane, was used.

In Example 25, the detection sensitivity of the sensor 20 in the perpendicular direction when the load Fz of 1 kPa and 100 kPa was applied to the sensor 20 in the perpendicular direction was 3 and 120, respectively. This detection sensitivity was a high value during a low-pressure time and during a high-pressure time. Further, in Example 25, the displacement detection sensitivity when the displacement was 5 μm was 5, a high value.

Example 26

In Example 26, the thickness of the first deformation layer 44 was 25 μm, and the weight per unit area was 0.9 mg/cm². Further, in Example 26, a nanofiber including polyurethane was used as the material of the first deformation layer 44.

Further, in Example 26, the thickness of the second deformation layer 48 was 500 μm, and the weight per unit area was 12 mg/cm². Further, in Example 26, as the material of the second deformation layer 48, PORON (registered trademark)SS-24DP, which is a foam film including polyurethane, was used.

In Example 26, the detection sensitivity of the sensor 20 in the perpendicular direction when the load Fz of 1 kPa and 100 kPa was applied to the sensor 20 in the perpendicular direction was 3 and 120, respectively. This detection sensitivity was a high value during a low-pressure time and during a high-pressure time. Further, in Example 26, the displacement detection sensitivity when the displacement was 5 μm was 10, a high value.

Example 27

In Example 27, the thickness of the first deformation layer 44 was 25 μm, and the weight per unit area was 0.9 mg/cm². Further, in Example 27, a nanofiber including polyurethane was used as the material of the first deformation layer 44.

Further, in Example 27, the thickness of the second deformation layer 48 was 500 μm, was the weight per unit area was 7.5 mg/cm². Further, in Example 27, as the material of the second deformation layer 48, PORON (registered trademark) SS-15DP, which is a foam film including polyurethane, was used.

In Example 27, the detection sensitivity of the sensor 20 in the perpendicular direction when the load Fz of 1 kPa and 100 kPa was applied to the sensor 20 in the perpendicular direction was 10 and 200, respectively. This detection sensitivity was a high value during a low-pressure time and during a high-pressure time. Further, in Example 27, the displacement detection sensitivity when the displacement was 5 μm was 15, a high value.

Comparative Example 9

In Comparative Example 9, the thickness of the first deformation layer 44 was 500 μm, and the weight per unit area was 12 mg/cm². Further, in Comparative Example 9, PORON (registered trademark) SS-24DP, which is a foam film including polyurethane, was used as the material of the first deformation layer 44.

Further, in Comparative Example 9, the thickness of the second deformation layer 48 was 100 μm, and as the material of the second deformation layer 48, Neofix (registered trademark) 100, which is a double-sided tape, was used.

In Comparative Example 9, the detection sensitivity of the sensor 20 in the perpendicular direction when the load Fz of 1 kPa and 100 kPa was applied to the sensor 20 in the perpendicular direction was 3 and 120, respectively. This detection sensitivity was a high value during a low-pressure time and during a high-pressure time. On the other hand, in Comparative Example 9, the displacement detection sensitivity when the displacement was 5 μm was 1 or less, a low value.

Comparative Example 10

In Comparative Example 10, the thickness of the first deformation layer 44 was 25 μm, and the weight per unit area was 0.9 mg/cm². Further, in Comparative Example 10, a nanofiber including polyurethane was used as the material of the first deformation layer 44.

Further, in Comparative Example 10, the thickness of the second deformation layer 48 was 100 μm, and as the material of the second deformation layer 48, Neofix (registered trademark) 100, which is a double-sided tape, was used.

In Comparative Example 10, the detection sensitivity of the sensor 20 in the perpendicular direction when the load Fz of 1 kPa and 100 kPa was applied to the sensor 20 in the perpendicular direction was 2 and 20, respectively. This detection sensitivity was not problematic during a low-pressure time while the detection sensitivity was a low value during a high-pressure time. Further, in Comparative Example 10, the displacement detection sensitivity when the displacement was 20 μm was 20, a high value.

Various Modified Examples

Hereinabove, the robot hand 10 has been described as an example of an electronic apparatus on which the sensor 20 is mounted. On the other hand, the electronic apparatus on which the sensor 20 is mounted is not limited to the robot hand 10, and may be another apparatus such as a mobile phone (including a smartphone) and a PC. Typically, any apparatus can be considered as the electronic apparatus as long as it is an apparatus on which the sensor 20 is mounted.

The present technology can also take the following configurations.

(1) A Sensor, including:
a sensor unit that includes a first pressure sensor on a front side and a second pressure sensor on a rear side that are opposite to each other and detects, on the basis of pressure detection positions in an in-plane direction by the first pressure sensor and the second pressure sensor, a force in the in-plane direction; and
a separation layer that has a gap portion and is interposed between the first pressure sensor and the second pressure sensor.

(2) The sensor according to (1), in which
the separation layer has a plurality of pole portions that is formed by the gap portion and extends in a perpendicular direction perpendicular to the in-plane direction.

(3) The sensor according to (2), in which
the gap portion is provided in a shape of a groove not penetrating the separation layer in the perpendicular direction.

(4) The sensor according to (2), in which
the gap portion is provided in a shape of a hole penetrating the separation layer in the perpendicular direction.

(5) The sensor according to (3), in which
the separation layer includes a first layer not having the gap portion and a second layer having the gap portion and the plurality of pole portions formed by the gap portion.

(6) The sensor according to (5), in which
the first layer is a layer on a side of the first pressure sensor, and
the second layer is a layer on a side of the second pressure sensor.

(7) The sensor according to (6), in which
the second layer is constituted by a relatively hard material than a material of the first layer.

(8) The sensor according to any one of (2) to (7), in which
the plurality of pole portions is each held in contact with the second pressure sensor,
the second pressure sensor has a plurality of sensing portions that detects a pressure, and
the plurality of pole portions is provided at positions corresponding to the plurality of sensing portions in the perpendicular direction.

(9) The sensor according to any one of (2) to (8), in which
the plurality of pole portions has a shape having a thickness constant in the perpendicular direction.

(10) The sensor according to any one of (2) to (8), in which
the plurality of pole portions has a shape having a thickness different in the perpendicular direction.

(11) The sensor according to (10), in which
the plurality of pole portions has a shape having a thickness that becomes smaller from the front side to the rear side in the perpendicular direction.

(12) The sensor according to any one of (1) to (11), in which
the sensor unit detects, on the basis of a value of a pressure detected by at least the first pressure sensor of the first pressure sensor and the second pressure sensor, a force in the perpendicular direction perpendicular to the in-plane direction.

(13) The sensor according to (12), in which
the first pressure sensor includes a first reference electrode layer, a sensor electrode layer including a plurality of sensing portions that detects a pressure, and a first deformation layer interposed between the first reference electrode layer and the sensor electrode layer,
the first deformation layer has a weight per unit area that is 50 mg/cm² or more, and
the first deformation layer has a thickness that is more than 100 μm and 1000 μm or less.

(14) The sensor according to (13), in which
the first deformation layer includes a porous layer.

(15) The sensor according to (13) or (14), in which
the first deformation layer includes a fiber layer.

(16) The sensor according to any one of (13) to (15), in which
the first deformation layer includes a nanofiber.

(17) The sensor according to any one of (13) to (16), in which
the first pressure sensor includes a second reference electrode layer and a second deformation layer interposed between the second reference electrode layer and the sensor electrode layer.

(18) The sensor according to any one of (12) to (17), in which
the second pressure sensor includes a first reference electrode layer, a sensor electrode layer including a plurality of sensing portions that detects a pressure, and a first deformation layer interposed between the first reference electrode layer and the sensor electrode layer,
the first deformation layer has a weight per unit area that is 50 mg/cm² or more, and
the first deformation layer has a thickness that is more than 100 μm and 1000 μm or less.

(19) The sensor according to (12), in which
the first pressure sensor includes a first reference electrode layer, a sensor electrode layer including a plurality of sensing portions that detects a pressure, a first deformation layer interposed between the first reference electrode layer and the sensor electrode layer, a second reference electrode layer, and a second deformation layer interposed between the second reference electrode layer and the sensor electrode layer,
the first deformation layer has a weight per unit area that is 3 mg/cm² or less,
the first deformation layer has a thickness that is 100 μm or less,
the second deformation layer has a weight per unit area that is 50 mg/cm² or more, and
the second deformation layer has a thickness that is more than 100 μm and 1000 μm or less.

(20) An electronic apparatus, including
a sensor including
a sensor unit that includes a first pressure sensor on a front side and a second pressure sensor on a rear side that are opposite to each other and detects, on the basis of pressure detection positions in an in-plane direction by the first pressure sensor and the second pressure sensor, a force in the in-plane direction, and
a separation layer that has a gap portion and is interposed between the first pressure sensor and the second pressure sensor.

REFERENCE SIGNS LIST 10 robot hand
20 sensor
21 sensor unit
22 pressure sensor
22a first pressure sensor
22b second pressure sensor
23 separation layer
33 gap portion
34 pole portion

The invention claimed is:

1. A sensor, comprising:
a sensor unit that includes a first pressure sensor on a front side and a second pressure sensor on a rear side that are opposite to each other and detects, on a basis of pressure detection positions in an in-plane direction by the first pressure sensor and the second pressure sensor, a force in the in-plane direction; and
a separation layer that has a gap portion and is interposed between the first pressure sensor and the second pressure sensor, wherein
the separation layer has a plurality of pole portions that is formed by the gap portion and extends in a perpendicular direction perpendicular to the in-plane direction.

2. The sensor according to claim 1, wherein
the gap portion is provided in a shape of a groove not penetrating the separation layer in the perpendicular direction.

3. The sensor according to claim 1, wherein
the gap portion is provided in a shape of a hole penetrating the separation layer in the perpendicular direction.

4. The sensor according to claim 2, wherein
the separation layer includes a first layer not having the gap portion and a second layer having the gap portion and the plurality of pole portions formed by the gap portion.

5. The sensor according to claim 3, wherein
the first layer is a layer on a side of the first pressure sensor, and
the second layer is a layer on a side of the second pressure sensor.

6. The sensor according to claim 5, wherein
the second layer is constituted by a relatively hard material than a material of the first layer.

7. The sensor according to claim 1, wherein
the plurality of pole portions is each held in contact with the second pressure sensor,
the second pressure sensor has a plurality of sensing portions that detects a pressure, and
the plurality of pole portions is provided at positions corresponding to the plurality of sensing portions in the perpendicular direction.

8. The sensor according to claim 1, wherein
the plurality of pole portions has a shape having a thickness constant in the perpendicular direction.

9. The sensor according to claim 1, wherein
the plurality of pole portions has a shape having a thickness different in the perpendicular direction.

10. The sensor according to claim 9, wherein
the plurality of pole portions has a shape having a thickness that becomes smaller from the front side to the rear side in the perpendicular direction.

11. The sensor according to claim 1, wherein
the sensor unit detects, on a basis of a value of a pressure detected by at least the first pressure sensor of the first pressure sensor and the second pressure sensor, a force in the perpendicular direction perpendicular to the in-plane direction.

12. The sensor according to claim 11, wherein
the first pressure sensor includes a first reference electrode layer, a sensor electrode layer including a plurality of sensing portions that detects a pressure, and a first deformation layer interposed between the first reference electrode layer and the sensor electrode layer,
the first deformation layer has a weight per unit area that is 50 mg/cm$^2$ or more, and
the first deformation layer has a thickness that is more than 100 µm and 1000 µm or less.

13. The sensor according to claim 12, wherein
the first deformation layer includes a porous layer.

14. The sensor according to claim 12, wherein
the first deformation layer includes a fiber layer.

15. The sensor according to claim 12, wherein
the first deformation layer includes a nanofiber.

16. The sensor according to claim 12, wherein
the first pressure sensor includes a second reference electrode layer and a second deformation layer interposed between the second reference electrode layer and the sensor electrode layer.

17. The sensor according to claim 11, wherein
the second pressure sensor includes a first reference electrode layer, a sensor electrode layer including a plurality of sensing portions that detects a pressure, and a first deformation layer interposed between the first reference electrode layer and the sensor electrode layer,
the first deformation layer has a weight per unit area that is 50 mg/cm$^2$ or more, and
the first deformation layer has a thickness that is more than 100 µm and 1000 µm or less.

18. The sensor according to claim 11, wherein
the first pressure sensor includes a first reference electrode layer, a sensor electrode layer including a plurality of sensing portions that detects a pressure, a first deformation layer interposed between the first reference electrode layer and the sensor electrode layer, a second reference electrode layer, and a second deformation layer interposed between the second reference electrode layer and the sensor electrode layer,
the first deformation layer has a weight per unit area that is 3 mg/cm$^2$ or less,
the first deformation layer has a thickness that is 100 µm or less,
the second deformation layer has a weight per unit area that is 50 mg/cm$^2$ or more, and
the second deformation layer has a thickness that is more than 100 µm and 1000 µm or less.

19. An electronic apparatus, comprising
a sensor including
a sensor unit that includes a first pressure sensor on a front side and a second pressure sensor on a rear side that are opposite to each other and detects, on a basis of pressure detection positions in an in-plane direction by the first pressure sensor and the second pressure sensor, a force in the in-plane direction, and a separation layer that has a gap portion and is interposed between the first pressure sensor and the second pressure sensor, wherein the separation layer has a plurality of pole portions that is formed by the gap portion and extends in a perpendicular direction perpendicular to the in-plane direction.

* * * * *